(12) United States Patent
Campbell

(10) Patent No.: US 11,930,032 B2
(45) Date of Patent: Mar. 12, 2024

(54) SYSTEM AND METHOD FOR ENUMERATING AND REMEDIATING GAPS IN CYBERSECURITY DEFENSES

(71) Applicant: Stephen H. Campbell, Hopkinton, MA (US)

(72) Inventor: Stephen H. Campbell, Hopkinton, MA (US)

(*) Notice: Subject to any disclaimer, the term of this patent is extended or adjusted under 35 U.S.C. 154(b) by 0 days.

(21) Appl. No.: 17/104,030

(22) Filed: Nov. 25, 2020

(65) Prior Publication Data

US 2021/0234885 A1    Jul. 29, 2021

Related U.S. Application Data

(60) Provisional application No. 62/939,774, filed on Nov. 25, 2019.

(51) Int. Cl.
*H04L 29/06* (2006.01)
*H04L 9/40* (2022.01)
*H04L 41/16* (2022.01)

(52) U.S. Cl.
CPC .......... *H04L 63/1433* (2013.01); *H04L 41/16* (2013.01); *H04L 63/1466* (2013.01); *H04L 63/20* (2013.01)

(58) Field of Classification Search
CPC . H04L 63/20; H04L 63/1433; H04L 63/1466; H04L 63/108; H04L 63/1425; H04L 63/302

USPC ........................................................ 723/25
See application file for complete search history.

(56) References Cited

U.S. PATENT DOCUMENTS

| 10,592,938 B2* | 3/2020 | Hogg ............... G06Q 30/0641 |
| 10,728,761 B2* | 7/2020 | Kedem ............. H04W 12/06 |

* cited by examiner

*Primary Examiner* — Longbit Chai
(74) *Attorney, Agent, or Firm* — Prince Lobel Tye LLP

(57) ABSTRACT

A method for identifying gaps in an organization's cyber defenses, and identifying and prioritizing remediations that are designed to eliminate those gaps, including using multiple choice questionnaires, wherein the answers to a series of multiple choice questions are scored for inherent risk, selecting security controls and calculating expected maturity scores for these controls based on the inherent risk score, using multiple choice questionnaires, wherein the answers to a series of multiple-choice questions are scored for actual control maturity, aggregating said actual and expected maturity scores and comparing these to identify and quantify gaps, and recommending and prioritizing control improvements that are designed to raise the score to an expected level. These steps are implemented using a computing device. In this manner the organization can identify a sequenced set of concrete steps it can take to achieve reasonable and effective security.

8 Claims, 18 Drawing Sheets

*Visualizing Priority and Level Goals*

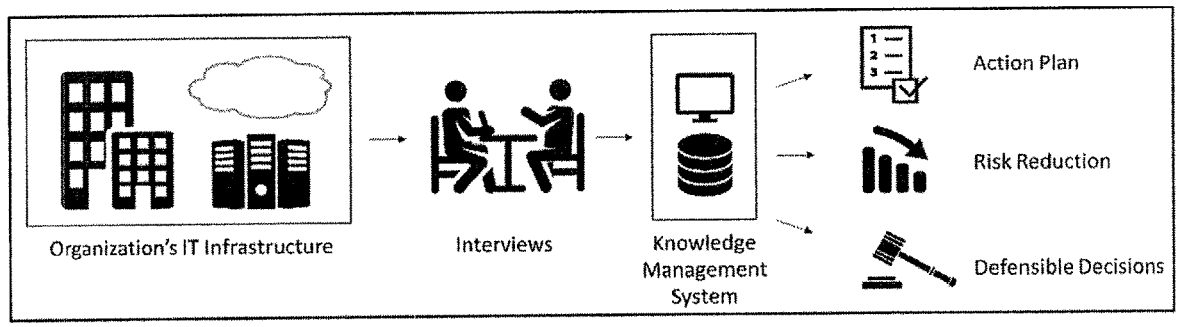
*Figure 1 High-Level Overview*
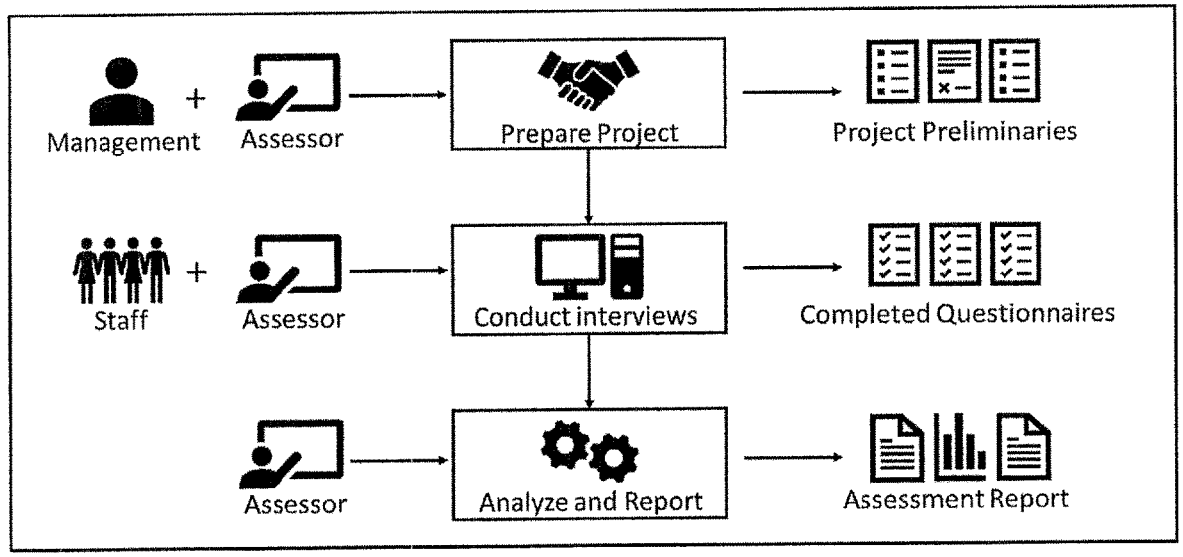
*Figure 2 The Process*

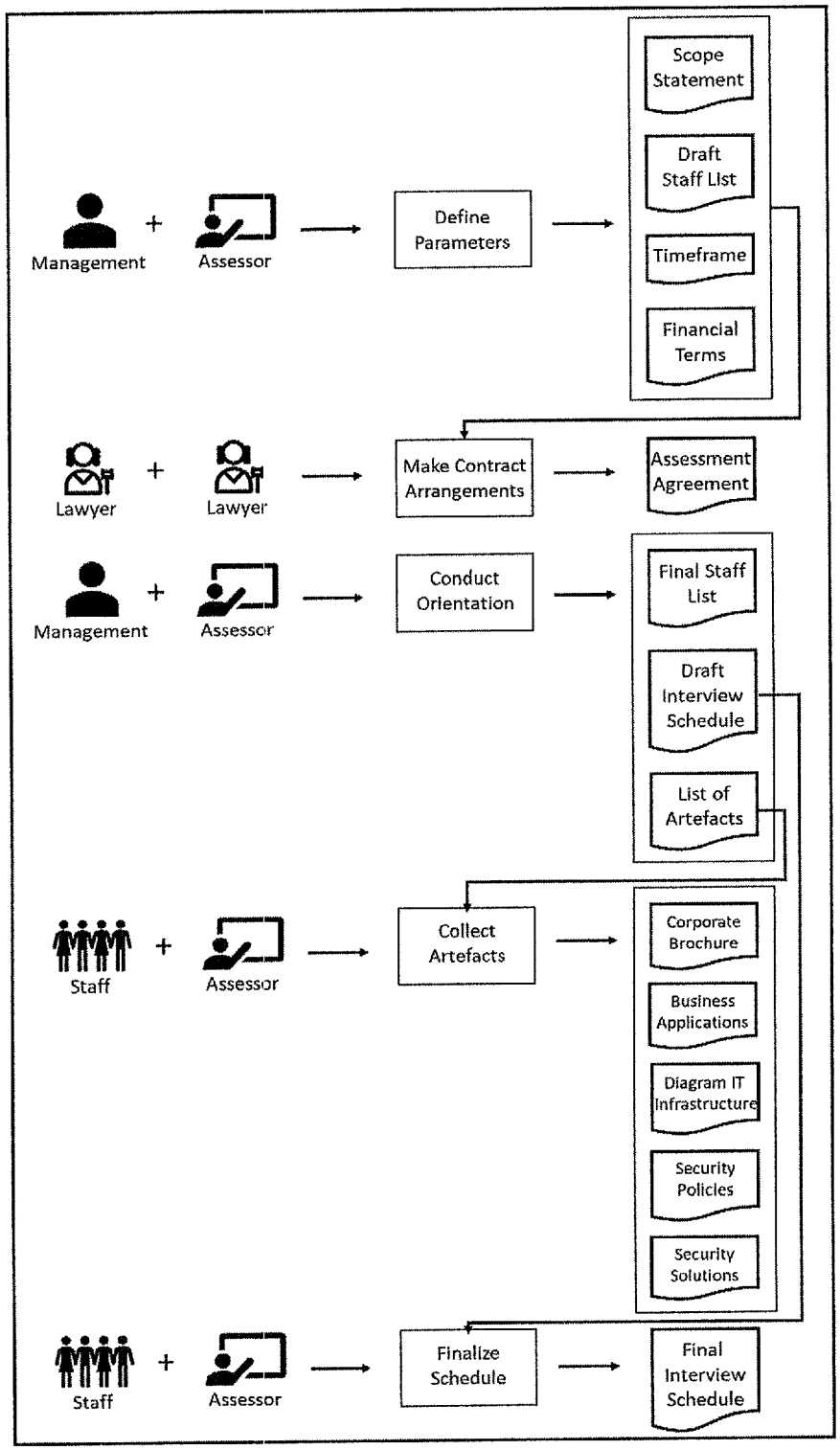
Figure 3 Flowchart for Prepare Project

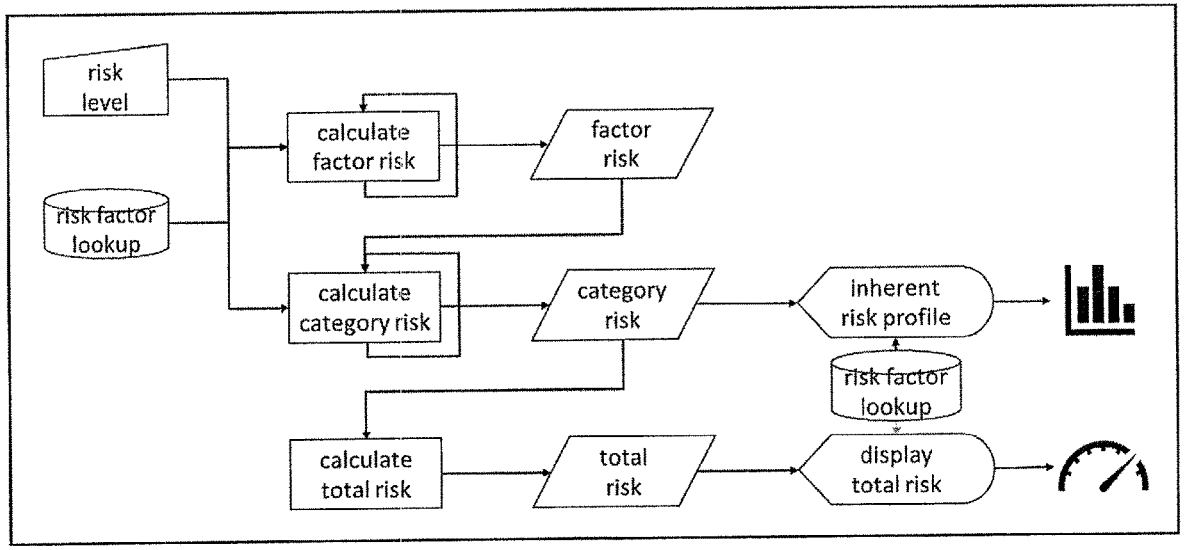
Figure 4 Calculating Inherent Risk
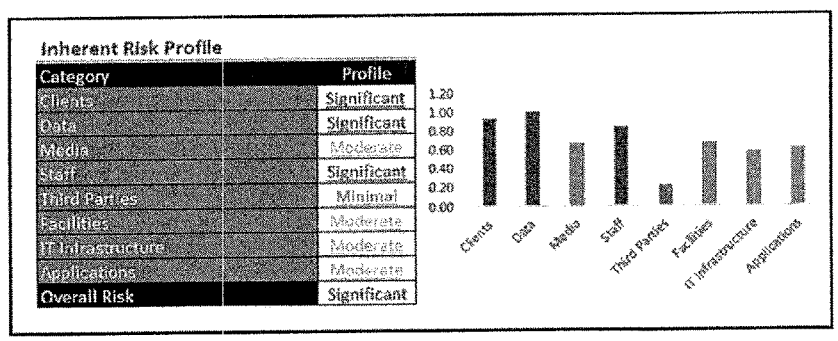
Figure 5 Example Inherent Risk Profile

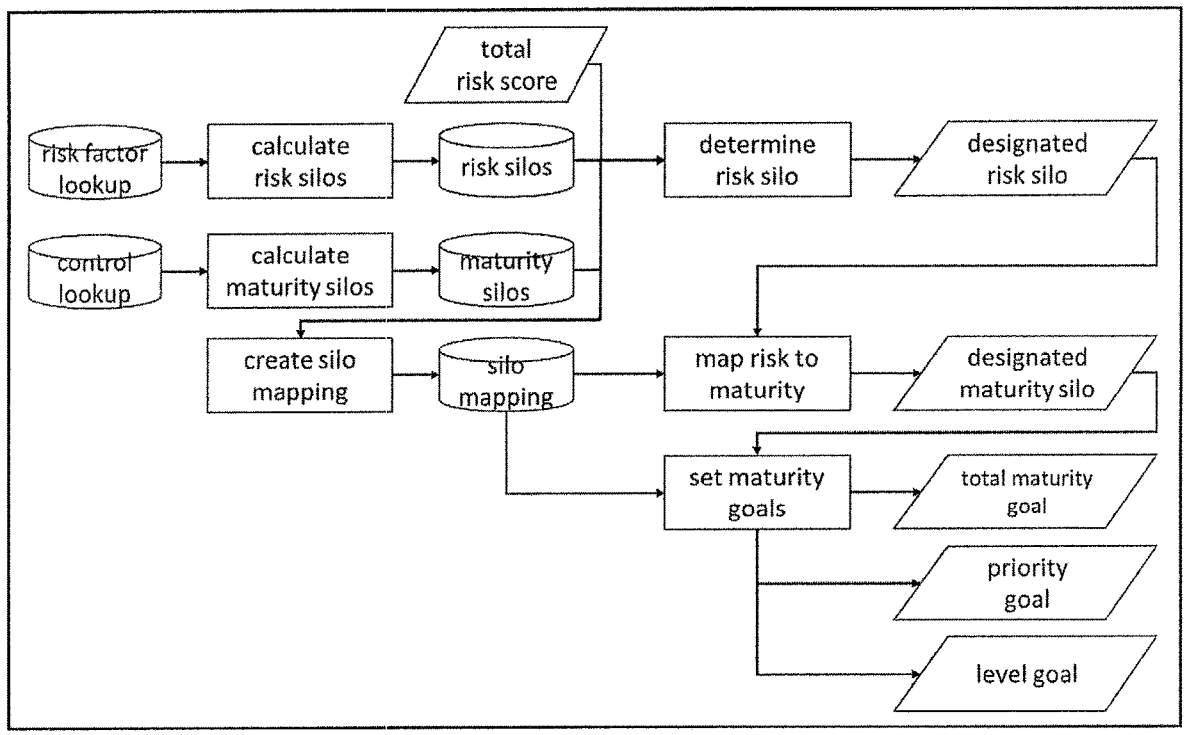
Figure 6 Setting Maturity Goals Based on Total Risk
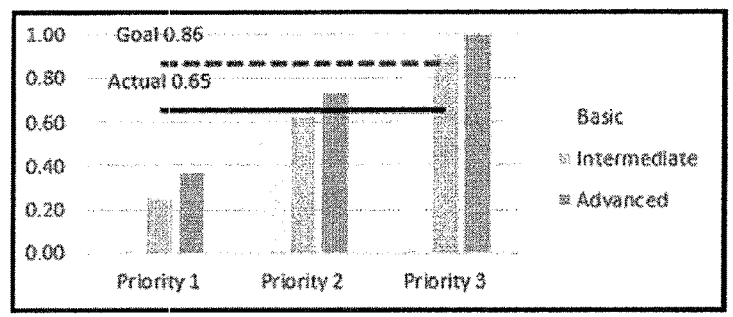
Figure 7 Visualizing Priority and Level Goals

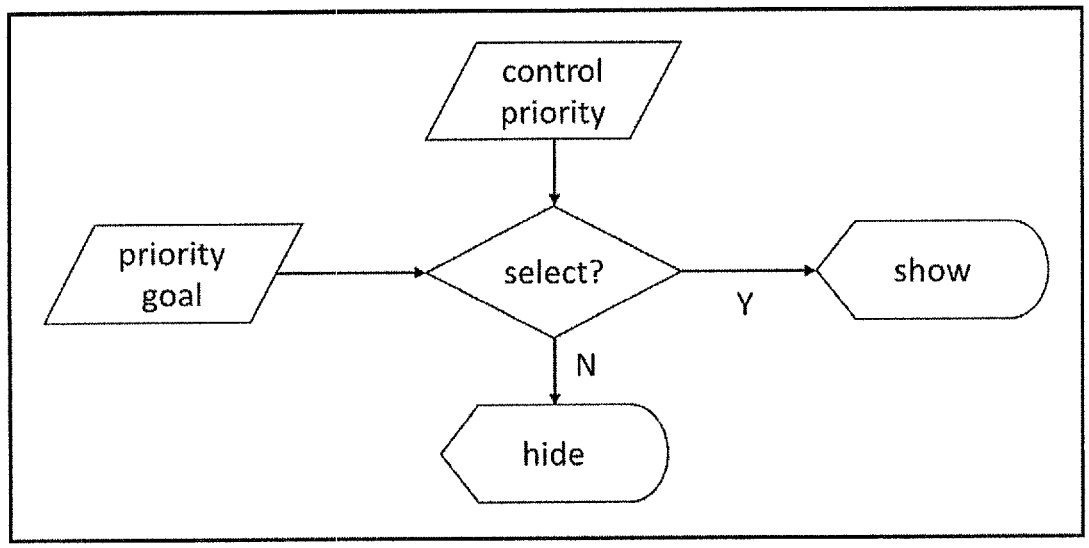
*Figure 8 Selecting Relevant Controls*
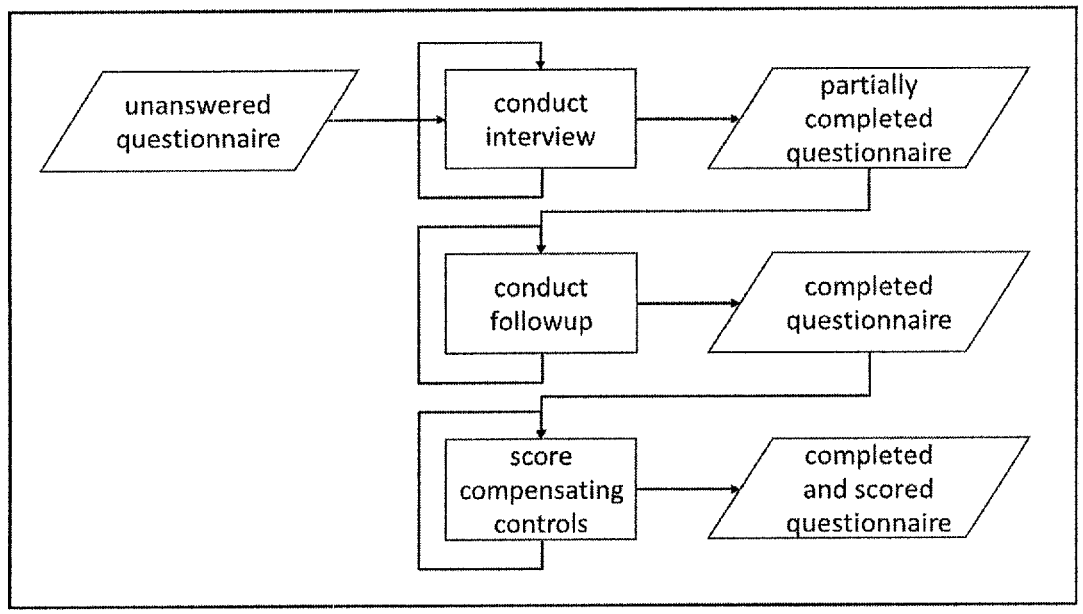
*Figure 9 Filling Out the Maturity Questionnaires*

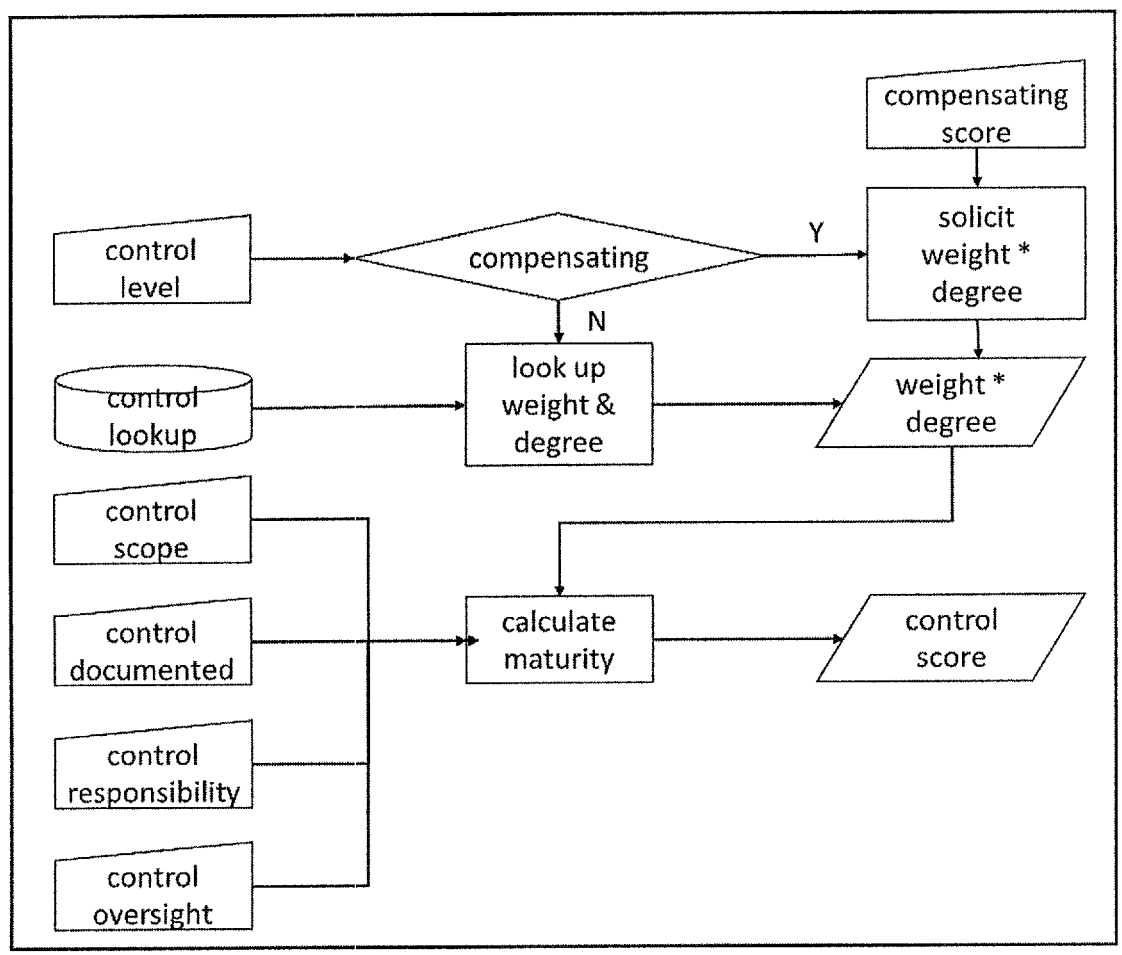
Figure 10 Calculating the Control Score

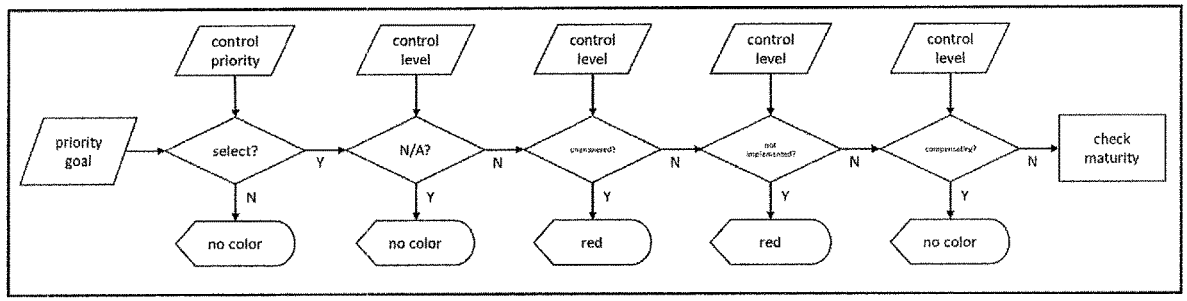
Figure 11 Check Red - Part 1 of Color Coding the Control Level
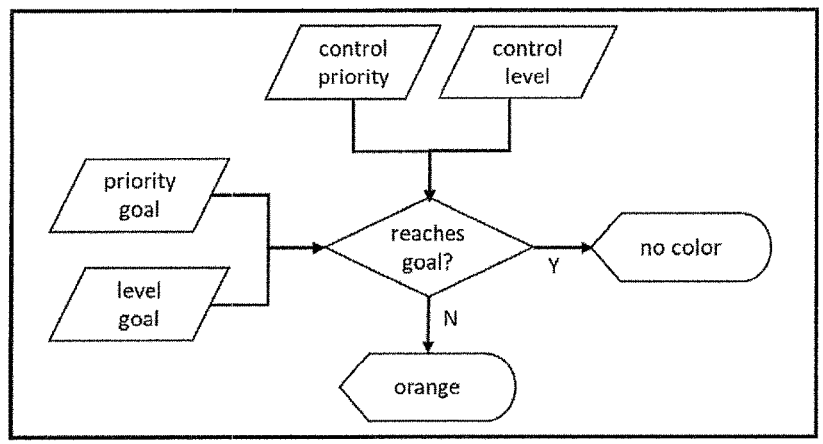
Figure 12 Check Orange - Part 2 of Color Coding the Control Level

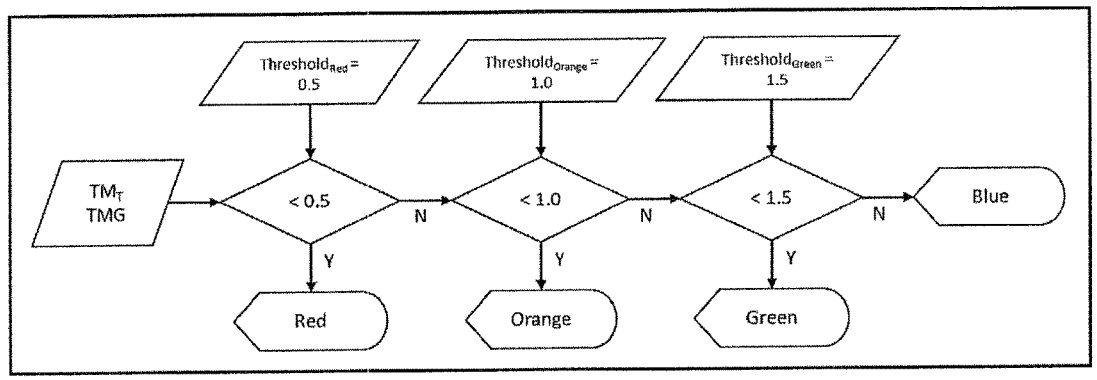
Figure 13 Color Coding overall Total Maturity
| Inherent Risk | Maturity Goal | Actual Maturity |
|---|---|---|
| Moderate | 0.49 | 0.29 |
Figure 14 Overall Assessment Results
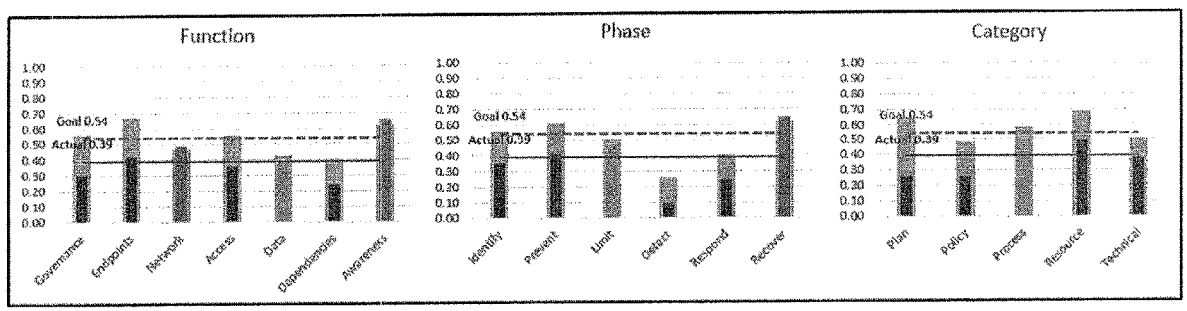
Figure 15 Example Maturity Profile

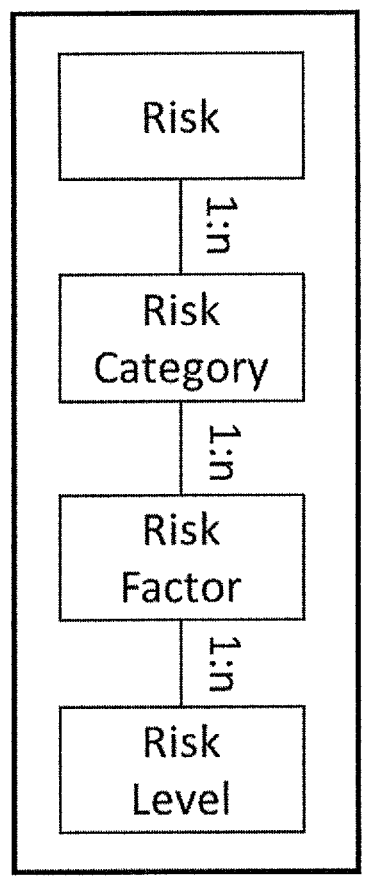
Figure 16 E-R Diagram Risk

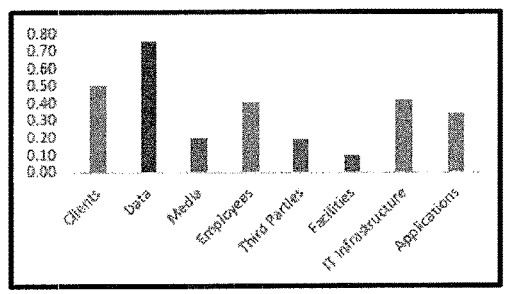
Figure 17 Example Inherent Risk Profile
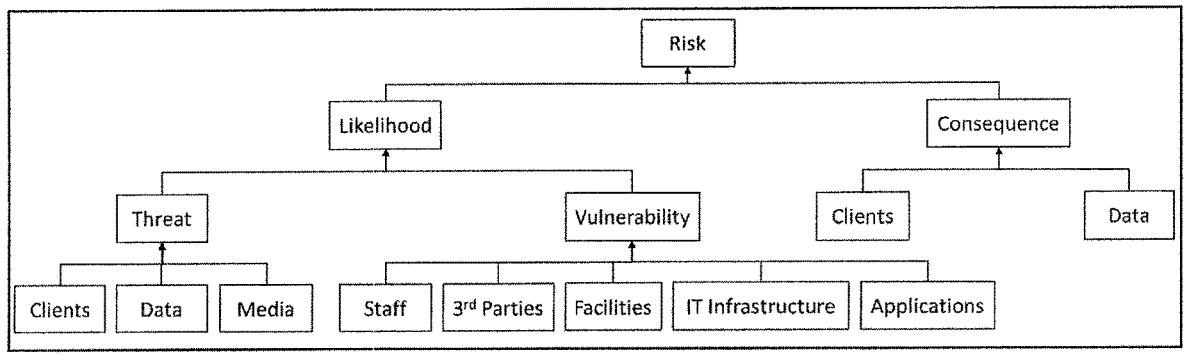
Figure 18 Inherent Risk Ontology
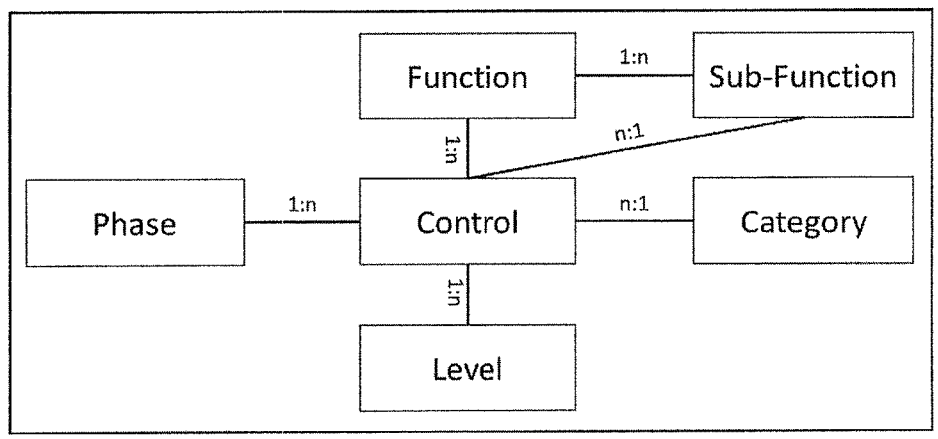
Figure 19 Entity-Relationship Diagram Control

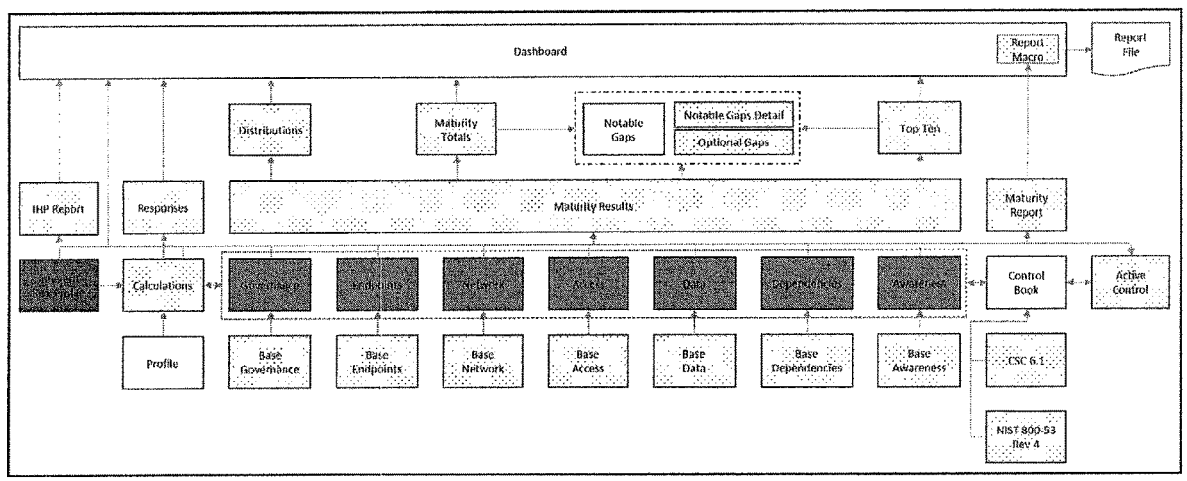
Figure 20 Microsoft Excel Data Flow Diagram

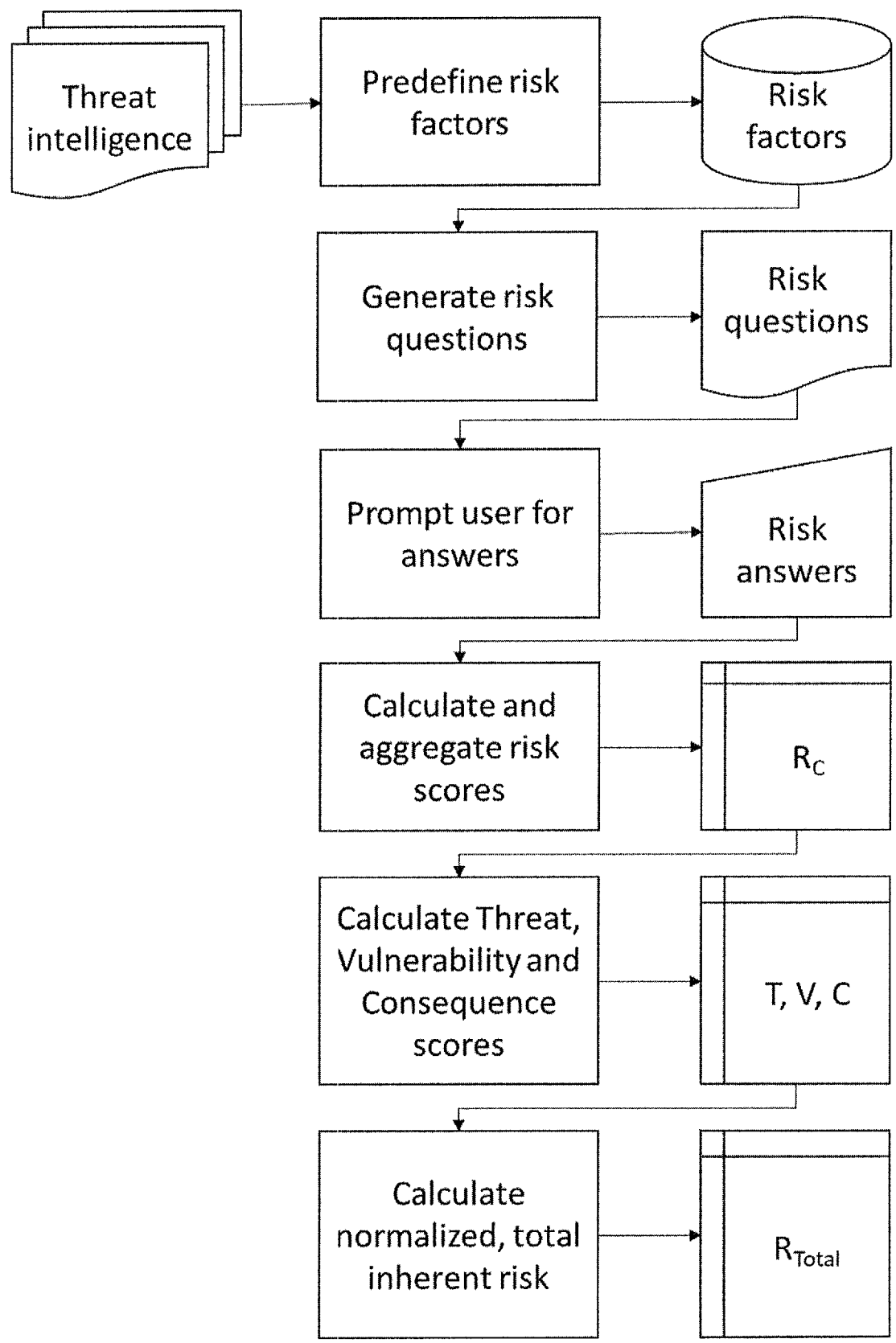
Figure 21 Inherent Risk

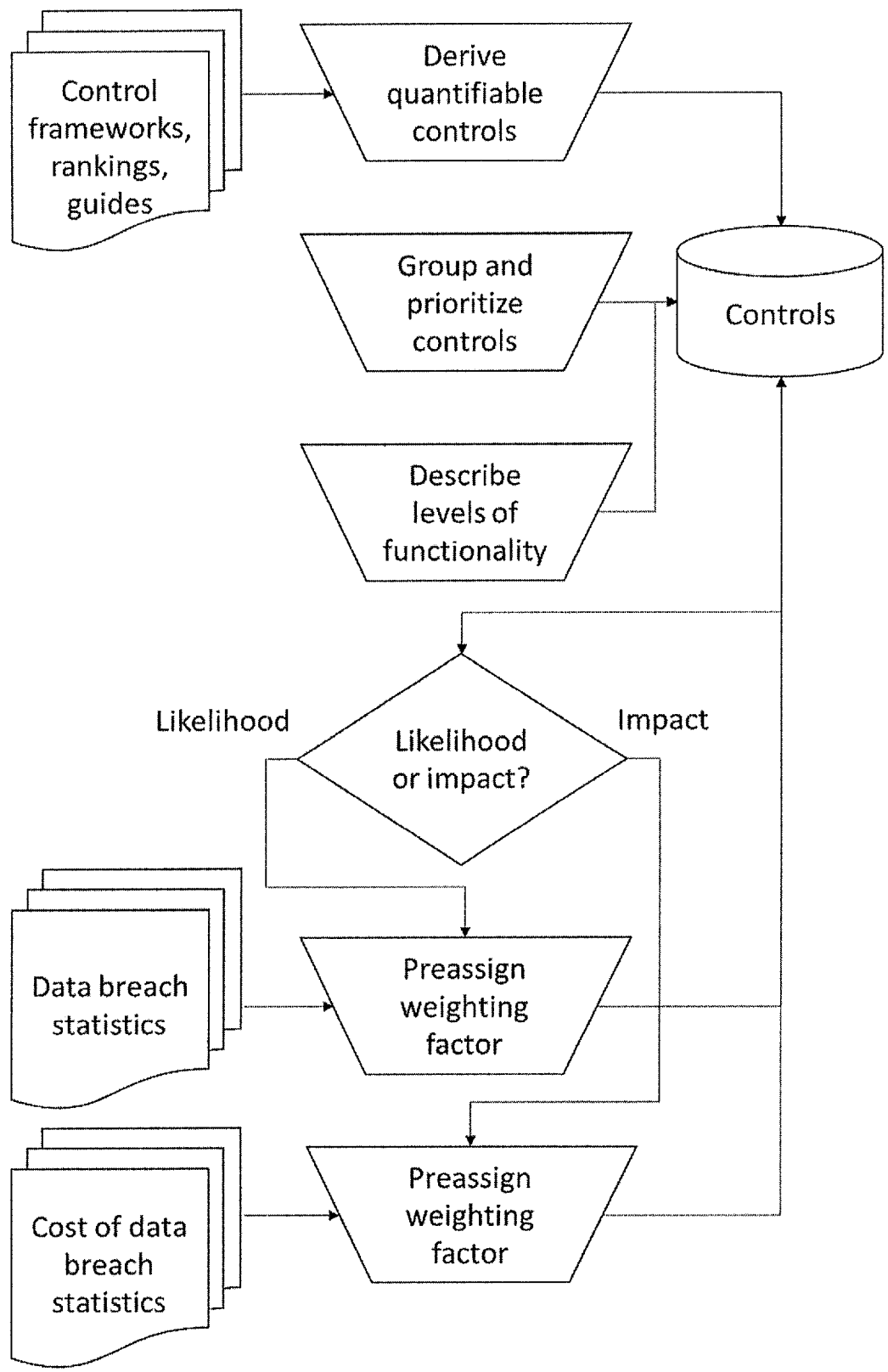
Figure 22 Predefining Controls

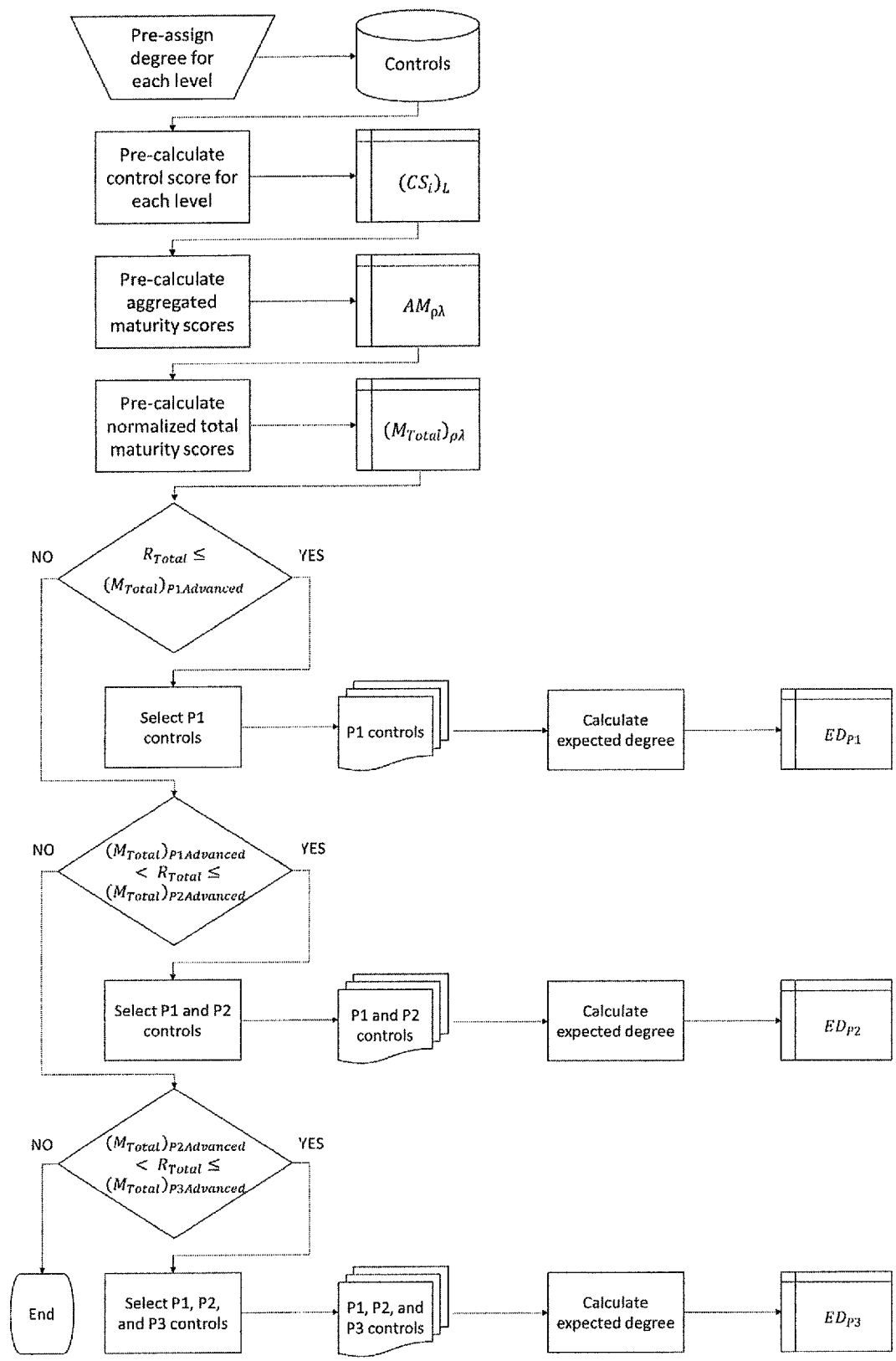
Figure 23 Selecting Controls and Calculating Expected Degree of Functionality Based on Risk

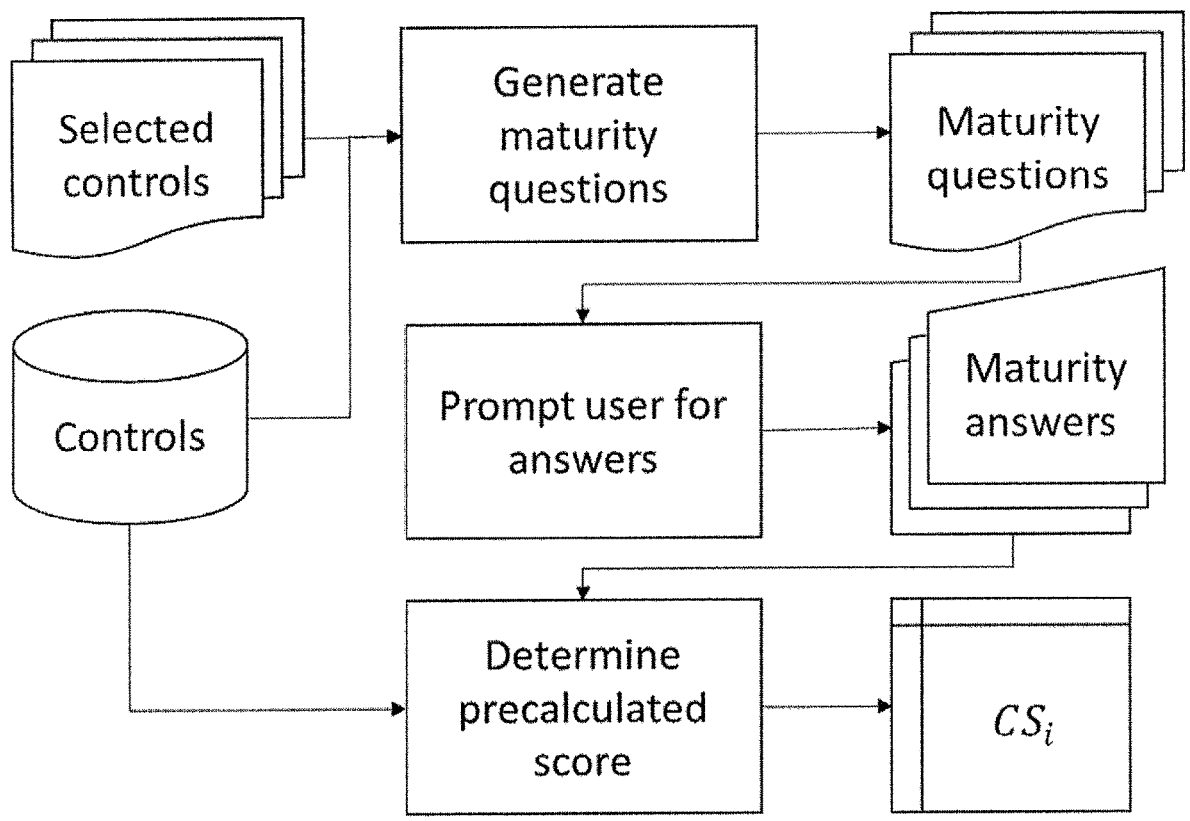
Figure 24 Control Maturity

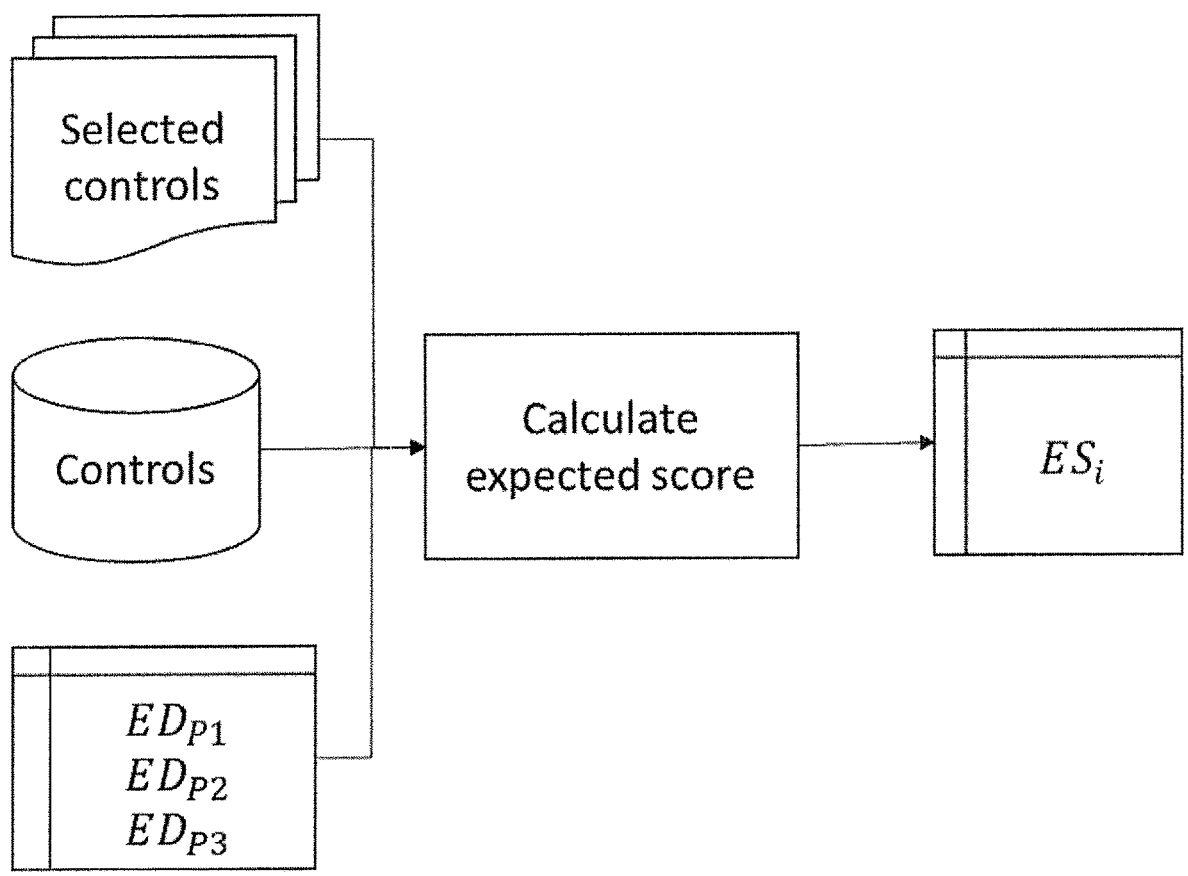
Figure 25 Expected Maturity

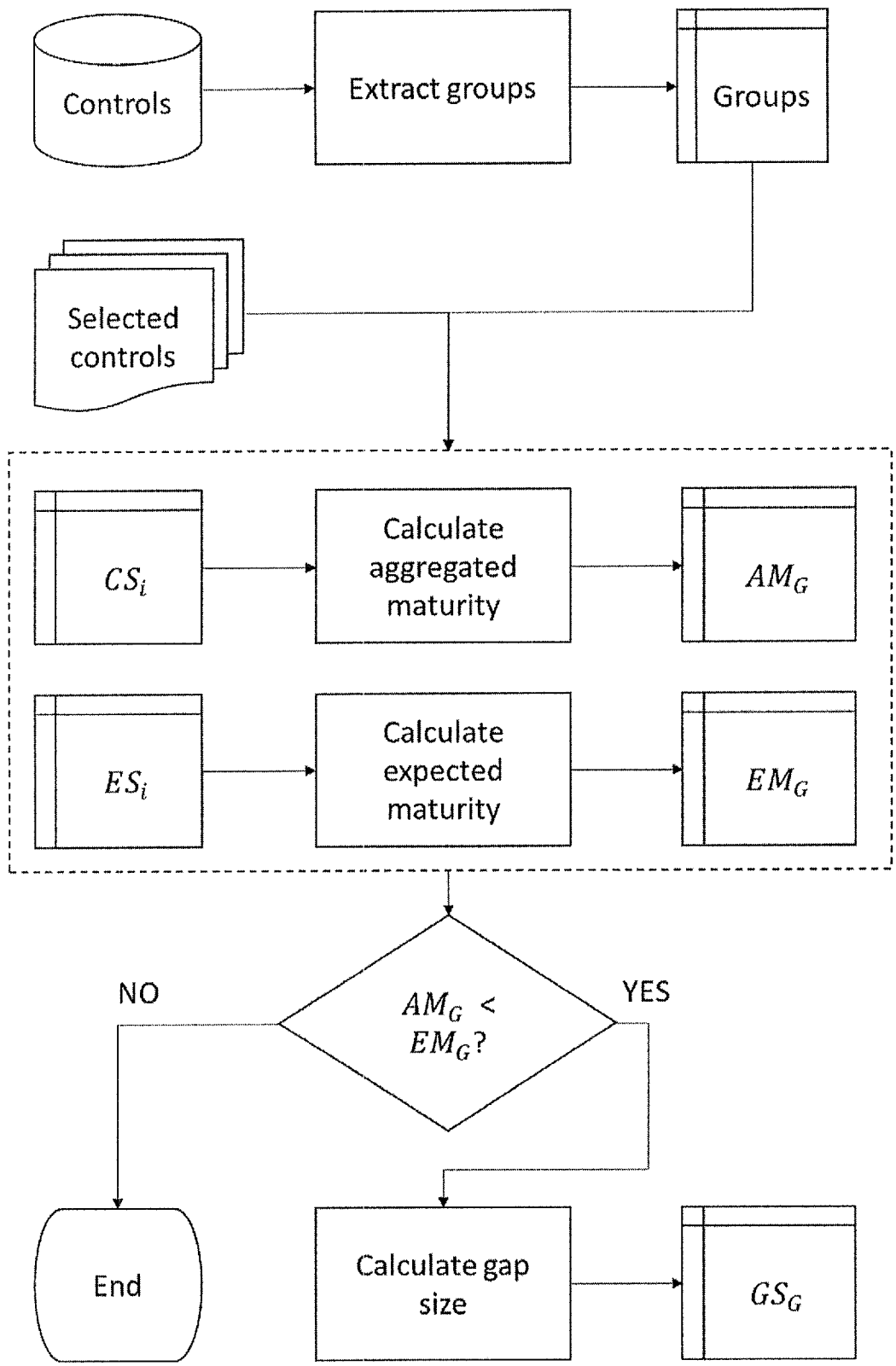
Figure 26 Aggregating Scores and Quantifying Gaps

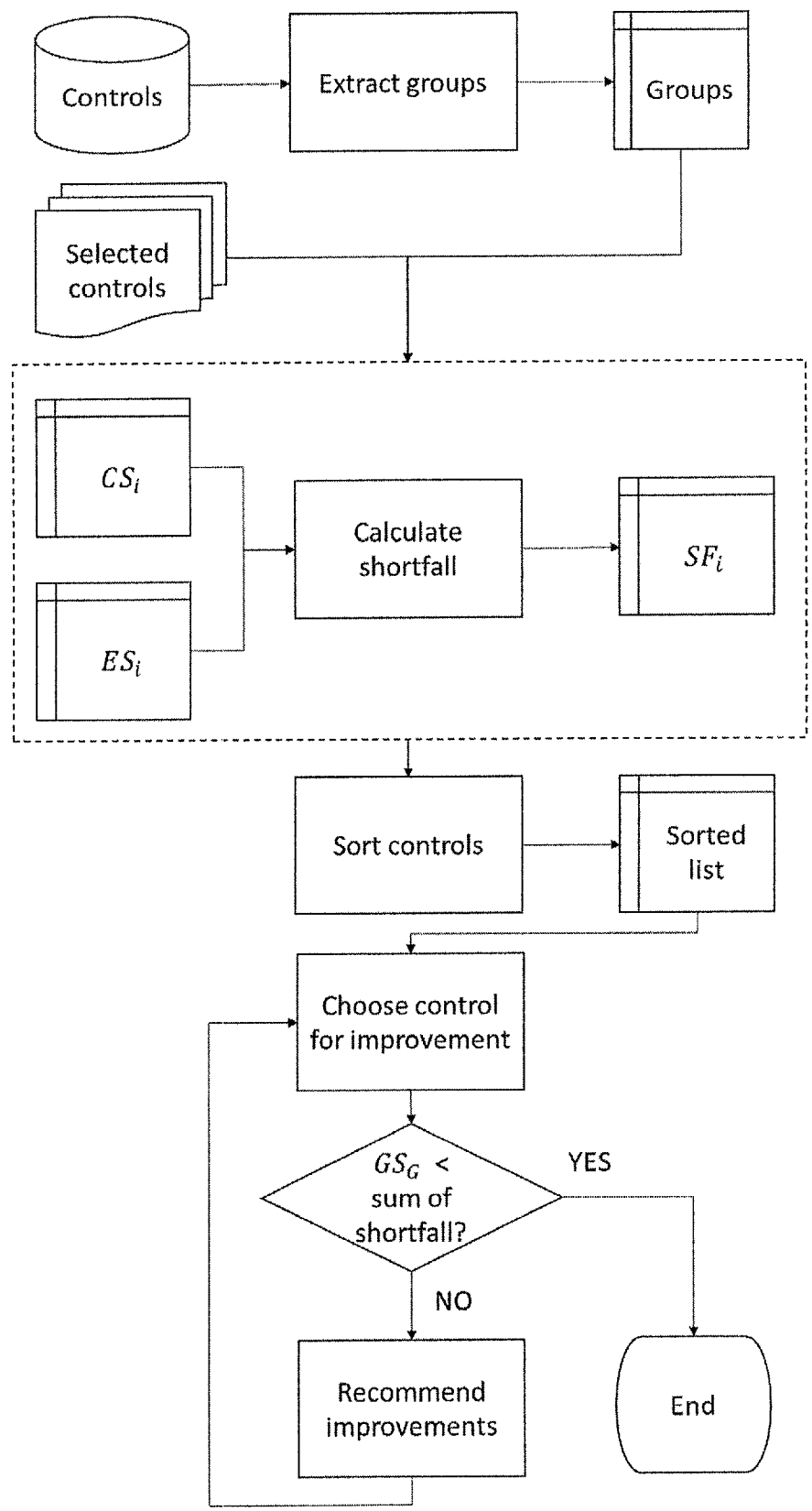
Figure 27 Recommending Control Improvements

SYSTEM AND METHOD FOR ENUMERATING AND REMEDIATING GAPS IN CYBERSECURITY DEFENSES

CROSS-REFERENCE TO RELATED APPLICATION

This application claims priority of Provisional Application 62/939,774 filed on Nov. 25, 2019, the disclosure of which is incorporated herein by reference.

BACKGROUND

This application relates to enumerating and remediating gaps in cybersecurity defenses. Gaps in cybersecurity defenses can lead to unwanted and potentially harmful intrusions. Such gaps should be identified and remediated.

SUMMARY

Featured in this disclosure are systems and methods for enumerating gaps in an organization's cybersecurity defenses and prescribing and prioritizing remediations for those gaps. In the disclosure, notable gaps in cybersecurity defenses are identified. The gaps can exist in a functional area, a lifecycle phase, and/or a security control category. The remediation involves steps the organization should take to implement cybersecurity that is reasonable according to industry norms and effective according to the current threat environment and the state of the art for defenses.

The following pages include a description of a system and process (sometimes termed herein "the Knowledge Management System" or "KMS") by which an organization's information security posture is assessed, actions that are expected to reduce the organization's exposure to information security compromise are identified and documented, and due diligence which is conducted by the organization in response is demonstrated.

Following is an overview of an example of the KMS and a process for accomplishing the process.

An Overview of the Knowledge Management System

The Knowledge Management System is a decision support aid designed to: (1) assess the information security posture of an Organization, (2) identify and document actions which reduce its exposure to information security compromise, and (3) demonstrate that the Organization is performing due diligence. The objective of such an assessment is to assess an Organization's inherent risk of information security compromise, to identify gaps in its cyber defenses that present notable residual risk, and to prioritize and describe possible remediations for these gaps.

"Inherent risk" means the likelihood that the confidentiality, integrity and/or availability of information is at risk of being compromised and that such compromise would have a negative effect on the Organization, unless policies, processes, and controls are in place to protect it. "Cyber defenses" mean the set of policies, processes and controls in place to prevent security events that could compromise the confidentiality, integrity, and/or availability of the information, and to detect, respond to, mitigate, and recover in a timely manner from those security events that are not prevented. "Residual risk" refers to the likelihood that such a compromise would still occur despite the implementation of a set of policies, processes, and controls. "Notable residual risk" occurs when the organization may be carrying a larger residual risk than may be deemed reasonable by litigators and regulators according to current industry norms.

The target of an assessment is the Organization's confidential and critical information and supporting information technology services and infrastructure. "Confidential and critical information" is defined here as any information that is proprietary to the Organization, its clients, or its employees and is not publicly available, including, without limitation, information that is:

Attorney-client privileged;

Information which, if disclosed or altered in an unauthorized manner, could cause damage to the interests of the Organization, its clients, or its employees;

Information, the lack of access to which, if rendered inaccessible in an unauthorized manner, could cause damage to the interests of the Organization, its clients, or its employees;

Material non-public information concerning financial assets that are tradable on public or secondary markets;

Personally Identifiable Information ("PII") for any employee, contractor, client, or supplier of the Organization. PII is defined herein as information that can be used to identify, contact, or locate a natural person, including, without limitation, a client or website user of the Organization, the customer or website user of a client of the Organization, natural person's name, IP address, email address, postal address, telephone number, account numbers, date of birth, driver's license or other government-issued identification card numbers and social security numbers, or any other information that is linked or linkable to an individual;

Protected Health Information ("PHI") for any employee, contractor, client, or supplier of the Organization;

Information related to the physical security of the Organization's or its clients' operations;

Information relating to the Organization or its clients' cyber security;

Information from any source that may tend to incriminate the Organization or its clients, subject the Organization or its clients to fines or penalties, form the basis for litigation against the Organization or its clients, or which may tend to damage the Organization's or its clients' reputation or the reputation of the Organization's or its clients' officers, directors, employees, or agents;

Information that is legally required to be protected under the laws applicable to the Organization's or its clients' data.

The precise target of an assessment is defined in a legal contract agreed with the Organization. It may include confidential information and supporting IT services and infrastructure stored and processed within the organization's headquarters and on-premise data center, within its oversees and branch offices, by specific organizational units or departments, by designated service providers, or any combination of these.

The process constitutes a concise risk and controls assessment. It is not an audit. It is intended to assist the senior management or partners of an Organization in the evaluation and management of their cyber risk reduction program. It is not intended as a verification of the veracity of claims made by an Organization's managers or partners regarding their risk management program. In contrast to an audit, it is intentionally designed as a low overhead process. An audit might require extensive review of documentation and evidentiary proof of the effectiveness of risk reduction measures.

This is also a human assessment. It is not a technical assessment. It is based on a series of interviews rather than the use of technical scanners or probes. It is a broad appraisal of an Organization's cybersecurity risk reduction program, including people, process and technology. It does not provide the specificity and depth, that, for example, the use of technical vulnerability scanners or penetration testing might provide. On the other hand, it is designed to assist leaders to select and execute defensible due diligence measures that are derived from industry norms and efficacy formulae. See FIG. 1 for a high-level overview of the process.

The Knowledge Management System uses estimations of digital asset value, exposure, and threat to assess an organization's inherent risk of information security compromise. It then uses cyber risk formulae to assess the maturity of the organization's information security defenses, based upon control efficacy ratings drawn from objective and subjective evaluative criteria. The assessed maturity score is compared to a target score, which is set according to the typical set of controls that a reasonable organization would select and implement to mitigate its inherent risk in accordance with contemporary industry norms. Where the assessed maturity score falls short of the target score, the Knowledge Management System enumerates the missing defenses and makes prescriptive and prioritized recommendations for improvement.

In an aspect a method for identifying gaps in an organization's cyber defenses, and identifying and prioritizing remediations that are designed to eliminate those gaps, includes:
  using multiple choice questionnaires, wherein the answers to a series of multiple choice questions are scored for inherent risk;
  selecting security controls and calculating expected maturity scores for these controls based on the inherent risk score;
  using multiple choice questionnaires, wherein the answers to a series of multiple-choice questions are scored for actual control maturity;
  aggregating said actual and expected maturity scores and comparing these to identify and quantify gaps;
  and recommending and prioritizing control improvements that are designed to raise the score to an expected level;
  wherein the steps above are implemented using a computing device;
  in this manner the organization can identify a sequenced set of concrete steps it can take to achieve reasonable and effective security.

In some examples the answers tip a series of multiple-choice questions are scored for inherent risk as follows:
  using expert judgment and open source threat intelligence, predefining a list of generic risk factors and grouping these into risk categories for "Assets", "Data", "Media", "Staff", "3$^{rd}$ Parties", "Facilities", "IT infrastructure", and "Applications";
  using expert judgement and open source threat intelligence, pre-assigning a weighting factor $w_i$ for each risk factor i, which represents an estimate of the size of risk factor i relative to other factors in the same category;
  using expert judgement, pre-assigning a set of declarative statements for each of said risk factors, which describe levels of minimal, moderate, and significant risk;
  using expert judgement, pre-assigning a numerical value between 0 and 1 for each declarative statement, which represents an estimated risk rating $r_{ij}$ for risk factor i and level j;
  prompting the user with the choice of said declarative statements for each of said risk factors;
  receiving the chosen response from the user and multiplying the risk rating $r_{ij}$ for the chosen level j by the weighting factor pre-assigned for this risk factor $w_i$, to establish an inherent risk score $R_i$ for factor i, as in the formula $R_i = w_i r_{ij}$;
  adding up the risk scores for each risk category C and dividing by the maximum total risk score for each category C to generate a normalized category risk score, as in the formula $R_C = \sum_{i=1}^{n} w_i r_i / \sum_{i=1}^{n} w_i \max(r_i)$, where $\max(r_i) = r_{iSignificant}$ and n is the number of risk factors in risk category C;
  calculating a threat score T using the risk scores for the "Assets", "Data", and "Media" categories, and the formula $T = R_{Assets} + R_{Data}/2 * (0.5 + 0.5 * R_{Media})$;
  calculating a vulnerability score V using the risk scores for the "Staff", "3$^{rd}$ Parties", "Facilities", "IT Infrastructure", and "Applications" categories, and the formula $$V = \frac{(R_{Staff} + R_{3rd\ Parties} + R_{Facilities} + R_{IT\ Infrastructure} + R_{Applications})}{5};$$

calculating a consequence score C using the risk scores for the "Assets" and "Data" categories and the formula $C = (R_{Assets} + R_{Data})/2$;
  calculating a normalized total inherent risk score $R_{Total}$ using said scores for threat, vulnerability and consequence and the formula $$R_{Total} = \sqrt[3]{(TVC)};$$

wherein the steps above are implemented using a computing device.

In some examples selecting security controls and calculating expected maturity scores for these controls based on the inherent risk score involves:
  predefining, prioritizing and grouping a universe of security controls that can be implemented at different levels of functionality and pre-assigning a weighting factor for each control;
  selecting from this universe a set of controls that the organization is expected to implement to achieve reasonable security based on its normalized total inherent risk;
  for each selected control, calculating the degree of functionality that the organization is expected to implement to achieve effective security based on its normalized total inherent risk;
  for each selected control, calculating an expected score by multiplying the expected degree of functionality for this control by the weighting factor, as in the formula $ES_i = w_i * ED_{P_i}$;
  wherein the steps above are implemented using a computing device.

In some examples predefining, prioritizing and grouping a universe of security controls that can be implemented at different levels of functionality and pre-assigning a weighting factor for each control involves:
  identifying a set of security best practices and technologies from government and industry regulations, best practice surveys, control frameworks, intelligence agency control rankings, and industry analyst guides;

using expert judgement to combine and rearrange said best practices and technologies to derive a set of security controls based on activities, artefacts or properties whose security effectiveness can be quantified with, at minimum an ordinal scale, but preferably an interval or ratio scale;

pre-assigning each of said derived controls to one of the following functional groups: "Governance", "Endpoints", "Network", "Access", "Data", Dependencies" and "Awareness";

pre-assigning each of said derived controls to one of the following lifecycle groups: "Identify", "Prevent", "Limit", Detect", "Respond", "Recover";

pre-assigning each of said derived controls to one of the following control groups: "Plan", "Policy", "Procedure", "Resource", or "Technical";

ensuring that every combination of said functional group and said lifecycle group has at least one security control;

pre-assigning a specific priority P1, P2, or P3 to each control based on best practice surveys, customary norms, intelligence agency control rankings, NIST Baselines, or Center for Internet Security Implementation Classes;

pre-assigning a set of declarative statements to each control which describe basic, intermediate and advanced levels of functionality, wherein each higher level either subsumes or replaces and improves the functionality of the level(s) below it;

designating each of said derived controls as a predominantly likelihood-reducing control of impact-reducing control;

pre-assigning a weighting factor $w_i$ for each likelihood-reducing control i, which is an estimate of the fraction of all security incidents that the control will block or contain, based on open source data breach statistics;

pre-assigning a weighting factor $w_i$ for each impact-reducing control i, which is an estimate of the fraction by which the control will reduce the impact of a security incident, based on open source cost of data breach statistics;

In some examples selecting from this universe a set of controls that the organization is expected to implement to achieve reasonable security based on its normalized total inherent risk involves:

pre-assigning a numerical value between 0 and 1 for each declarative statement for each control i in 4, representing an estimate of the degree of functionality ($Degree_i)_L$ of the control implemented at level L relative to its maximum functionality (implemented at the advanced level);

multiplying the weighting factor pre-assigned to each control in 4 by said numerical value for each declarative statement to determine a precalculated score for the control for basic, intermediate, and advanced levels of functionality, as in the formula $(CS_i)_L = w_i * (Degree_i)_L$, where L is the level of functionality (basic, intermediate, or advanced);

pre-calculating cumulative aggregated maturity scores $AM_{\rho\lambda}$ by adding together said precalculated control scores for each combination of priority $\rho$ (P1, P2, and P3) assigned in 4 and level $\lambda$ (basic, intermediate, advanced) described in 4, as in the formula $AM_{\rho\lambda} = AM_{(\rho-1)Advanced} + \Sigma_{i=1}^{N_\rho}(CS_i)_\lambda$, where $N_\rho$ is the number of controls with priority $\rho$;

dividing said cumulative aggregated maturity scores by the maximum possible aggregated maturity score, obtained by implementing all controls (P1, P2, and P3) at the advanced level, to yield a matrix of nine normalized total maturity scores, as in $(M_{Total})_{\rho\lambda} = AM_{\rho\lambda}/\Sigma_{i=1}^{N}w_i$, where N is the total number of controls;

selecting only P1 controls if the normalized total inherent risk score $R_{Total}$ in 2 is equal or less than said normalized total maturity score for P1 at the advanced level, $(M_{Total})_{P1Advanced}$; selecting P1 and P2 controls if the normalized total inherent risk score $R_{Total}$ in 2 is greater than said normalized total maturity score for P1 at the advanced level, $(M_{Total})_{P1Advanced}$, but equal or less than said normalized total maturity score for P2 at the advanced level, $(M_{Total})_{P2Advanced}$;

selecting P1, P2 and P3 controls if the normalized total inherent risk score $R_{Total}$ in 2 is greater than said normalized total maturity score for P2 at the advanced level, $(M_{Total})_{P2Advanced}$, but equal or less than said normalized total maturity score for P3 at the advanced level, $(M_{Total})_{P3Advanced}$;

wherein the steps above are implemented using a computing device.

In some examples involving, for each control, calculating the degree of functionality that the organization is expected to implement to achieve effective security based on its normalized total inherent risk, involves:

if only P1 controls are selected in 5, then calculating the expected degree for all P1 controls $ED_{P1}$ by dividing the normalized total inherent risk by the sum of the weighting factors for all P1 controls, as in the formula $$ED_{P1} = \frac{R_{Total}}{\Sigma_{i=1}^{I} w_i},$$

where I is the number of controls with priority P1;

if P1 and P2 controls are selected in 5, then setting the expected degree for all P1 controls to 1 and calculating the expected degree for all P2 controls $ED_{P2}$ by subtracting the sum of the weighting factors for all P1 controls from the normalized total inherent risk and dividing the remainder by the sum of the weighting factors for all P2 controls, as in the formula $ED_{P2} = (R_{Total} - \Sigma_{i=1}^{I} w_i)/\Sigma_{j=1}^{J} w_j$, where I is the number of controls with priority P1, and J is the number of controls with priority P2;

if P1, P2 and P3 controls are selected in 5, then setting the expected degree for all P1 and P2 controls to 1 and calculating the expected degree for all P3 controls $ED_{P2}$ by subtracting the sum of the weighting factors for all P1 and P2 controls from the normalized total inherent risk and dividing the remainder by the sum of the weighting factors for all P3 controls, as in the formula $ED_{P3} = (R_{Total} - \Sigma_{i=1}^{I} w_i - \Sigma_{j=1}^{J} w_j)/\Sigma_{k=1}^{K} w_k$, where I is the number of controls with priority P1, J is the number of controls with priority P2, and K is the number of controls with priority P3;

wherein the steps above are implemented using a computing device.

In some examples using multiple choice questionnaires, wherein the answers to a series of multiple-choice questions are scored for control maturity, involves:

for each control i selected in 5, prompting the user with the choice of declarative statements pre-assigned to this control in 4;

determining based on the response to said choice the precalculated score for the control described in 5, and equating the control score for said control to said precalculated score, as in the formula $CS_i=w_i*Degree_i$;

wherein the steps above are implemented using a computing device.

In some examples aggregating said actual and expected maturity scores and comparing these to identify and quantify gaps involves:

for each functional, lifecycle, and control group defined in 4, calculating the actual group aggregated maturity score by adding up the maturity scores for all selected controls pre-assigned to said functional, lifecycle, or control group, as in the formula $AM_G=\Sigma_{i=1}^{n} CS_i$, where there are n controls in group G;

for each functional, lifecycle, and control group defined in 4, calculating the expected group aggregated maturity score by adding up the expected scores for all selected controls pre-assigned to said functional, lifecycle, or control group, as in the formula $EM_G=\Sigma_{i=1}^{n} ES_i$, where there are n controls in group G;

for each functional, lifecycle, and control group defined in 4, comparing the actual group aggregated maturity score to the expected group aggregated maturity score for all selected controls pre-assigned to said functional, lifecycle, or control group, as in the formula $AM_G<EM_G$?;

if the actual group aggregated maturity score is less than the expected group aggregated maturity score, then identifying the difference as a gap in said functional, lifecycle, or control group and calculating the size of the gap by subtracting the actual group aggregated maturity score from the expected group aggregated maturity score, as in the formula $GS_G=EM_G-AM_G$;

wherein the steps above are implemented using a computing device.

In some examples recommending and prioritizing control improvements that are designed to raise the score to an expected level involves:

for each functional, lifecycle, or control group G with a gap identified in 8;

for each security control i pre-assigned to said group, calculating the size of the shortfall for the control by subtracting the control score from the expected score for this control, as in the formula $SF_i=ES_i-CS_i$;

sorting all security controls pre-assigned to said group whose control scores fall short of their expected scores, in ascending order of priority (P1 then P2 then P3) followed by descending order of the size of the shortfall $SF_i$;

working through the sorted list, choosing controls for improvement, each time subtracting the size of the shortfall $SF_i$ from the size of the gap for said group $GS_G$, until there are no more controls or the sum of shortfall for the chosen controls equals or exceeds the size of the gap, as in the formula $GS_G \leq \Sigma_{\rho=P1}^{P3} \Sigma_{i=1}^{g} Max(SF_i)_\rho$, where $Max(SF_i)_\rho$ is the largest remaining shortfall in the sorted list of controls with priority ρ in group G and g is the number of controls in group g with a nonzero shortfall;

recommending improvements in functionality for said chosen controls, according to the declarative statements pre-assigned in 4 for the missing levels of functionality;

wherein the steps above are implemented using a computing device.

BRIEF DESCRIPTION OF THE DRAWINGS

FIG. 1 is a flowchart showing a high-level overview of the assessment process.

FIG. 2 is a flowchart providing a more detailed view of the assessment process broken into three phases.

FIG. 3 is a flowchart illustrating the tasks involved in the first phase of the assessment (Prepare Project).

FIG. 4 is a flowchart illustrating the behind the scenes calculation of inherent risk.

FIG. 5 is a screenshot of a sample Inherent Risk Profile showing the risk in each category as well as overall risk.

FIG. 6 is a flowchart illustrating the process the KMS follows to establish goals for the maturity assessment.

FIG. 7 is a screenshot showing a sample bar chart of the maturity silos for each priority and level as well as the overall actual maturity and maturity goal.

FIG. 8 is a flowchart illustrating the selection of controls relevant to the maturity assessment.

FIG. 9 is a flowchart illustrating the steps involved in completing and scoring the maturity questionnaires.

FIG. 10 is a flowchart illustrating the process the KMS uses to calculate the maturity score for a control.

FIG. 11 is a flowchart showing the criteria used by the KMS when coloring the input fields in the maturity questionnaires red.

FIG. 12 is a flowchart showing the criteria used by the KMS when coloring the input fields in the maturity questionnaires orange.

FIG. 13 is a flowchart showing the criteria used by the KMS when coloring the overall Total Maturity and the Total Maturity for each group on the dashboard.

FIG. 14 is a screenshot of the executive overview section of the dashboard showing a sample overall maturity score and goal for the assessment.

FIG. 15 is a screenshot of a sample maturity profile showing total maturity scores for each function, lifecycle, and control category.

FIG. 16 shows an entity relationship diagram of the constituents of inherent risk.

FIG. 17 is a screenshot showing a sample Inherent Risk Profile showing the risk in each category.

FIG. 18 is a diagram depicting the risk ontology used in the KMS.

FIG. 19 shows an entity relationship diagram of the constituents of control maturity.

FIG. 20 is a flowchart showing the flow of data between the worksheets in Excel.

FIG. 21 is a flowchart illustrating the steps involved in the method wherein the answers to a series of multiple-choice questions are scored for inherent risk.

FIG. 22 is a flowchart illustrating the steps involved in the method involving predefining, prioritizing and grouping a universe of security controls that can be implemented at different levels of functionality and pre-assigning a weighting factor for each control.

FIG. 23 is a flowchart illustrating the steps involved in the methods involving selecting from this universe a set of controls that the organization is expected to implement to achieve reasonable security and calculating the expected degree of functionality for each control that the organization is expected to implement to achieve effective security, based on the organization's normalized total inherent risk.

FIG. 24 is a flowchart illustrating the steps involved in the method involving using multiple choice questionnaires, wherein the answers to a series of multiple-choice questions are scored for control maturity.

FIG. 25 is a flowchart illustrating the steps involved in the method comprising, for each selected control, calculating an expected score by multiplying the expected degree of functionality for this control by the weighting factor.

FIG. 26 is a flowchart illustrating the steps involved in the method involving aggregating said actual and expected maturity scores and comparing these to identify and quantify gaps.

FIG. 27 is a flowchart illustrating the steps involved in the method involving recommending and prioritizing control improvements that are designed to raise the score to an expected level.

DETAILED DESCRIPTION

The Process

A more detailed view of the process is outlined in FIG. 2.

The process consists of three phases: Prepare Project, Conduct Interviews, and Analyze and Report.

Preparing a Project

The first phase of the process is to agree and formalize the objectives, scope and resources for the project and to gather relevant documents for the assessment. See FIG. 3 for a detailed flowchart of this phase, including specific deliverables. There are five tasks in this phase: define parameters, make contract arrangements, conduct orientation, collect artefacts, and finalize schedule.

Define Project Parameters

The Organization's management sets project parameters with guidance from the assessor. These parameters include a precisely scoped description of the target of the assessment (some combination of headquarters, specific organizational units, projects, branch offices, geographies, data centers, ISPs, cloud providers etc.), the human resources and time commitments that will be allocated (including internal staff, service provider staff, manhours anticipated), the timeframe of the project (project definition and scoping, information gathering and interviews, analysis and reporting of findings and recommendations), and the financial terms for the assessment (payment amount and schedule). The scope of the project needs to be balanced with the desired timeframe for completion. A whole-of-company assessment is likely to require collection and analysis of more documents, demand interviews with more staff, and take longer to score and prioritize than, for example, the assessment of a specific line-of-business, facility/site, or department.

To optimize the utility of an assessment, the Organization needs to commit the requisite internal and external staff to the process. The Organization needs to assign one or more staff the task of collecting and delivering the preliminary artefacts required by the assessor prior to the interviews. It then needs to assign qualified staff for each of the interviews which the assessor will conduct:

Completion of the Inherent Risk questionnaire will normally require the participation of one or more senior business leaders familiar with the Organization's clients and financials, and an IT manager familiar with the Organization's overall IT infrastructure.

Completion of the Control Maturity questionnaires require both managerial and technical staff: managers for the areas of governance, situational awareness, and third party or dependency management, and technical staff for the areas of endpoint security, network security, access and data management.

The areas of governance and situational awareness will normally require the participation of the Organization's most senior IT security professional or an IT manager with responsibility for information security. Third party or dependency management, which involves vendor selection, vendor contracts and vendor audits, may involve general counsel or supporting legal counsel.

Endpoint security questions are typically handled by a knowledgeable systems administrator. Network security questions are typically handled by a knowledgeable network engineer or operator. Access management is typically the domain of application or system administrators. And data management may be the domain of records managers or information owners.

If a significant amount of the Organization's confidential and critical information is managed by third parties such as Managed Service Providers, it is incumbent upon the Organization to make special business arrangements with these third parties to incorporate them into the interview schedule, since the Organization's own staff may not be able to answer all the questions regarding security controls in sufficient detail. The Organization needs to appoint a single point of contact to act as its coordinator for the project. Similarly, each Managed Service Provider incorporated into the KMS interview schedule needs to appoint a single point of contact to act as its coordinator for the project.

The timing of the project needs to take account of impending business and IT events, such as office moves, mergers and acquisitions, new IT systems or upgrades, impending outsourcing arrangements etc. For example, an assessment can serve to educate the Organization's senior leadership on information security best practices and technology requirements which can be demanded of technology providers as part of an impending IT upgrade. Alternatively, an assessment can establish a new security baseline following the implementation of a new datacenter, system or outsourcing arrangement.

The duration of an assessment will depend on several factors, including the size and complexity of the Organization's information infrastructure, the availability of key staff for document collection, interviews and email follow-up, and the assessors' schedules. The total elapsed time for an assessment can be anywhere between six weeks and six months depending upon the size and complexity of the target of the assessment.

The final parameters to be defined are the financial and legal terms of the engagement between the Organization and the assessor. These include the fees for the assessment, when these are due, the acceptance terms for completion of the assessment, and whether the Organization chooses the Cloaked Engagement option. This option establishes an attorney-client relationship through execution of a separate Engagement Letter.

Make Contract Arrangements

For this task, lawyers work out contractual terms and execute a signed agreement covering confidentiality, responsibilities, scope, timeframe and payment. The contractual details can be transcribed from the parameters defined in the previous task.

Conduct Orientation

The next task involves the assessor conducting an orientation session with those staff identified in the Define parameters task. The assessor explains the process and clarifies the data collected and the expertise needed to answer the different questionnaires. One of the objectives of the orientation is to ensure that those staff who have been picked are comfortable answering questions on the areas pertinent to their questionnaire(s). Otherwise the Organization may choose to assign different staff or bring additional staff on board to the project. If the Organization prefers to review the questions in advance before assigning staff, then the assessor can send these electronically. Note that the questionnaire for Inherent Risk is fixed. The other questionnaires regarding security controls are dynamic and based upon the answers in the Inherent Risk questionnaire. Thus, previews of the Control Maturity questionnaires can only be made AFTER completion of the Inherent Risk questionnaire.

Once a draft list of staff has been compiled, the parties can come up with a provisional interview schedule, starting with the Inherent Risk questionnaire and continuing with the Control Maturity questionnaires. If the parties decide that the interviews are best held face-to-face then they need to account for travel arrangements and costs. The orientation session should clarify the artefacts required by the assessor prior to conducting the interviews. These artefacts will give the assessor a jump-start on understanding the organization's business, technical and security environment, so that the interviews are more efficient:

- To facilitate an understanding of the Organization, the assessor may request a corporate brochure or similar document describing the Organization, its mission, its philosophy, its customers and its services.
- To facilitate an understanding of the Organization's business operations which process confidential or critical information, the assessor may request a list of business processes and associated software applications. This list should detail whether the process is in-house or outsourced. For in-house processes the list should detail whether the software used for the process is commercial or custom, the name of the software, and the version. For outsourced services, the list should detail the name of the vendor, the name of the service the Organization subscribes to, and an up-to-date description of the technology (hardware and software) supporting the service.
- To facilitate an understanding of the Organization's Information Technology Infrastructure supporting these business processes, the assessor may request diagrams outlining the Organization's internet connections, inter-office communications links, corporate intranet and datacenters, including all relevant branch offices, backup and recovery sites.
- To facilitate an understanding of the Organization's security posture, the assessor may request copies of the Organization's security policies, plans and procedures (Acceptable Use Policy, Confidentiality Policy, BYOD Policy, Incident Response Plan, Business Continuity and Data Recovery procedures etc.), and a list of the Organization's security solutions, including dedicated devices/appliances (firewalls, email and web gateways, proxy servers etc.), on-premise security software (anti-malware, anti-spam, URL filtering, intrusion detection etc.), and cloud-based security services (DNS filtering, anti-phishing, sandboxing etc.). Details for security solutions should include vendor name, product or service name, and version.

The final objective of the orientation session is to decide upon a secure communication protocol for the transmission of documents between the parties. This can be as simple as password-protected Zip archives or Acrobat files where passwords are shared "out-of-band" (e.g. if the documents are sent via email then the password might be sent via SMS text). Alternatively, a protocol based upon Public Key Infrastructure or other secure mechanism can be used.

Collect Artefacts

Before the interviews can begin, the Organization needs to compile the various documents outlined in the previous task and send these securely to the assessor for review using the agreed secure communication protocol. The assessor will review the documents in preparation for the interviews.

Finalize Interview Schedule

The final preparatory task is to nail down the schedule for each of the KMS interviews and whether these will be conducted on-site or remotely.

Conduct Interviews

Once the project has been adequately prepared and all the project preliminaries are taken care of, the second phase of the KMS process involves populating the Knowledge Management System with answers to the questionnaires. There are three tasks in this phase: completing the inherent risk questionnaire (manual), mapping inherent risk to control maturity (automated), and completing the control maturity questionnaires (manual).

Completing the Inherent Risk Questionnaire

The first questionnaire to be completed is the Inherent Risk questionnaire. With guidance from the assessor, the Organization's representatives work through all the risk factors in the questionnaire, selecting a Risk Level for each factor. Behind the scenes the KMS calculates a Risk Score for each risk factor, aggregates these scores into categories, thereby creating the Inherent Risk Profile, and uses the category risk scores to calculate a score for the total inherent risk. This process is outlined in FIG. 4.

To calculate the Risk Score for a specific risk factor, the KMS uses the Risk Level that has been selected by the user ("1—Minimal", "2—Moderate", or "3—Significant") to look up the risk factor table. The score is calculated as the product of the Risk Rating times the Weight for that factor. To calculate an aggregate risk score for a specific Risk Category, the KMS sums all the Risk Scores for that category and divides this by the maximum Risk Score for the category, obtained by setting the Risk Level for each factor to "3—Significant". The KMS uses these category scores to create and display the Inherent Risk Profile as a colored bar chart. See FIG. 5.

To determine the color of the bar for a specific category, the KMS determines first whether the score is minimal, moderate or significant by finding the closest match to those scores which would be obtained if every factor in the category were set to level "1—Minimal", "2—Moderate" or "3—Significant", respectively. It does this by looking up the risk factor table. If the category score is closest to the value for all "1—Minimal" then the color is set to green. If the category score is closest to the value for all "2—Moderate" then the color is set to orange. If the category score is closest to the value for all "3—Significant" then the color is set to red. Unlike the Maturity Profile, color ranges for the Inherent Risk Profile are not customizable.

Finally, to calculate the total inherent Risk Score, the KMS uses the category scores in a formula for probabilistic risk which is described in the section The Technology Data Model→Inherent Risk. To determine the color for the total inherent Risk Score, the same logic is applied: the KMS determines first whether the total score is minimal, moderate or significant by finding the closest match to those scores which would be obtained if all risk factors were set to level "1—Minimal", "2—Moderate" or "3—Significant", respectively. If the total inherent Risk Score is closest to the value for "1—Minimal" then the color is set to green etc.

Mapping Inherent Risk to Control Maturity

Once the Inherent Risk questionnaire has been completed and the total inherent Risk Score calculated, the KMS establishes the goals for the maturity assessment. The higher the inherent risk, the more mature the security controls need to be.

The KMS maturity model has two components: selection maturity and implementation maturity—to manage a certain level of inherent risk, the KMS expects the organization to select certain controls or their equivalents (compensating controls) and implement them to a certain maturity level. Selection maturity in the KMS is characterized using the field "Priority", which establishes the chronological order in which controls should be implemented: P1 should be implemented before P2, which should be implemented before P3. Organizations with low inherent risk may only need to select P1 controls. Organizations with significant inherent risk will need to select P1, P2, and P3 controls. Organizations with moderate inherent risk will need to select P1 and P2 controls.

Implementation maturity in the KMS is characterized using the field "Implementation Factor", which takes account of the Degree of functionality implemented (the "Control Level"), the Scope of Implementation (how widely the control is implemented), and the Management Sophistication (whether the control is documented, whether responsibility for the control is defined, and whether oversight is exercised). For each priority in the KMS the controls can be implemented at three predefined Degrees or Control Levels—"Basic", "Intermediate", or "Advanced".

Thus, the KMS establishes three goals for the maturity assessment based on the total inherent Risk Score calculated above: a Total Maturity Goal (a number between 0 and 1—note that when the word "Total" is used it indicates that values have been both aggregated and normalized to an index between 0 and 1 i.e. the sum of the values is divided by the sum of the maximum possible values), a Priority (P1, P2 or P3), and a Control Level. For example, a total inherent Risk Score of 0.75 may correspond to a Total Maturity Goal of 0.83, which means implementing controls up to and including P3 at the Control Level of at least "Basic". The process by which the KMS establishes these three goals is outlined in FIG. 6.

If the distributions of inherent risk and maturity were identical then the KMS could simply use the total inherent Risk Score as the maturity score to aim for. However, the distributions are not the same. For example, the lower bounds are different. For inherent risk, the lower bound is the lowest possible total inherent Risk Score, obtained by setting all risk factors to "1—Minimal". For maturity, the lower bound is the lowest possible Score, obtained by selecting P1 controls and implementing these all at the "Basic" level. Because the inherent risk and maturity distributions are not identical, the KMS creates a mapping of the two distributions.

To create the mapping, the KMS first segments the scores for both inherent risk and maturity into predefined buckets or "silos":

If the user were to choose a Risk Level of "1—Minimal" for all risk factors, then the total inherent risk would be $R_{Minimal}$. If she were to choose a Risk Level of "2—Moderate" for all risk factors, then the total inherent risk would be $R_{Moderate}$. Or if she were to choose a Risk Level of "3—Significant", then the total inherent risk would be $R_{Significant}$. The KMS creates eight silos bounded by nine roughly equally spaced values for inherent risk as follows: $R_{Minimal}$, $R_{Minimal}+(R_{Moderate}-R_{Minimal})/4$, $R_{Minimal}+(R_{Moderate}-R_{Minimal})/2$, $R_{Minimal}+(R_{Moderate}-R_{Minimal})*3/4$, $R_{Moderate}$, $R_{Moderate}+(R_{Significant}-R_{Moderate})/4$, $R_{Moderate}+(R_{Significant}-R_{Moderate})/2$, $R_{Moderate}+(R_{Significant}-R_{Moderate})*3/4$, $R_{Significant}$.

If the user were to select P1 controls only and were to implement these all at a Control Level of "Basic" then the (normalized) total maturity would be $M_{P1Basic}$. If she were to select P1 controls only and implement them all at a Control Level of "Intermediate" then the total maturity would be $M_{P1Intermediate}$. If she were to select P1 controls and implement them all at a Control Level of "Advanced" then the total maturity would be $M_{P1Advanced}$. Similarly, if the user were to select P1 and P2 controls and implement the P1 controls at a Control Level of "Advanced" and the P2 controls at a Control Level of "Basic" then the total maturity would be $M_{P2Basic}$ etc. etc. This process results in eight silos bounded by nine roughly equally spaced maturity values from the lowest to the highest values.

The inherent risk values can be mapped to the maturity values as in Table 1 Mapping Inherent Risk to Maturity.

TABLE 1

Mapping Inherent Risk to Maturity

| Total Inherent Risk | Total Maturity |
| --- | --- |
| $R_{Minimal}$ | $M_{P1Basic}$ |
| $R_{Minimal} + (R_{Moderate} - R_{Minimal})/4$ | $M_{P1Intermediate}$ |
| $R_{Minimal} + (R_{Moderate} - R_{Minimal})/2$ | $M_{P1Advanced}$ |
| $R_{Minimal} + (R_{Moderate} - R_{Minimal})*3/4$ | $M_{P2Basic}$ |
| $R_{Moderate}$ | $M_{P2Intermediate}$ |
| $R_{Moderate} + (R_{Significant} - R_{Moderate})/4$ | $M_{P2Advanced}$ |
| $R_{Moderate} + (R_{Significant} - R_{Moderate})/2$ | $M_{P3Basic}$ |
| $R_{Moderate} + (R_{Significant} - R_{Moderate})*3/4$ | $M_{P3Intermediate}$ |
| $R_{Significant}$ | $M_{P3Advanced}$ |

Having created this mapping table, the KMS now determines which inherent risk silo the total risk score falls into, and then uses the mapping table to find the corresponding maturity silo. For example, if the total inherent risk falls somewhere between $R_{Moderate}+(R_{Significant}-R_{Moderate})/2$ and $R_{Moderate}+(R_{Significant}-R_{Moderate})*3/4$, then the corresponding Total Maturity score falls somewhere between $M_{P3Basic}$ and $M_{P3Intermediate}$. In this case, the KMS sets the Priority goal to P3 and the Control Level goal to "Intermediate" i.e. the Organization should aim to implement all P1, P2 and P3 controls: P1 and P2 controls to the highest ("Advanced") level, and P3 controls to a level of "Intermediate" or higher. This is depicted graphically in the KMS, as shown in FIG. 7.

The goal for the Total Maturity score is set by mapping the position of the total Risk Score within its risk silo to the corresponding position within its maturity silo using a simple linear algorithm. Using the same example above, the formula for the Total Maturity Goal is as follows:

$$TMG = M_{P3Basic} + \frac{(R_{Total} - (R_{Moderate} + (R_{Significant} - R_{Moderate})/2)) * (M_{P3Intermediate} - M_{P3Basic})}{(R_{Moderate} + (R_{Significant} - R_{Moderate})*3/4) - (R_{Moderate} + (R_{Significant} - R_{Moderate})/2)}$$

Completing the Control Maturity Questionnaires

After the Inherent Risk Questionnaire has been answered and the corresponding maturity goals have been set, the KMS works behind the scenes to select and show only those controls that are relevant to the Organization's inherent risk. This means that controls which have a higher priority than the Priority goal are not displayed in the KMS maturity questionnaires and are therefore not part of the assessment. This process is shown in FIG. 8.

The assessor then works with the designated staff from the Organization and its Service Providers to complete the maturity questionnaires. This constitutes the most resource-intensive task for the Organization. The interview schedule should include one interview for each of the seven questionnaires, three managerial and four technical: governance, awareness, dependencies (managerial), and endpoints, network, access, and data (technical). Each interview requires about 60 to 90 minutes. If the interviewee(s) are not able to answer all the questions in the questionnaire during the interview, then the assessor may follow up via email or telephone to answer any outstanding questions. Some interviewees prefer to answer open-ended rather than multiple choice questions. In this case the assessor can simply record the answers to the appropriate open-ended questions during the interviews and complete the multiple-choice questionnaires in the KMS at a later time. Finally, if, during the interviews, any controls have been designated a Control Level of "Compensating", then the assessor will need to assign these controls a Compensating Score. This value is a user-defined product for Weight*Degree. See Table 7 Control Prioritization, Table 8 Control User Input and Table 9 Derived and Calculated Control Fields within the section The Technology Data Model for details. The complete process is outlined in FIG. 9.

As the input fields for each control are filled out, the KMS works in the background to calculate a maturity score for the control called the Control Score. If the user chooses one of the predefined Control Levels ("Basic", "Intermediate" or "Advanced") then the KMS first multiplies the corresponding value for Degree by the value for Weight from the control lookup table. Alternatively, if the user decides to designate the Control Level as "Compensating" then the assessor must decide on an appropriate value for the product of Degree and Weight. This is called the "Compensating Score". Then, using this product and the values input by the user for Scope of Implementation, Policy Documented, Responsibility Defined, and Oversight Exercised, the KMS calculates the Control Score. To expedite the maturity interviews, the user may choose to set the Scope to "All" for each functional area and the discounts for "No Policy", "No Responsibility", and "No Discount" to zero in the User Profile ("Profile" worksheet").

The process the KMS uses to calculate the Control Score is depicted in FIG. 10. The basic formula for Control Score is:

Control Score=Weigh*Implementation Factor

The dominant term is the Weight, which is a measure of the control's risk-reducing power. In the KMS, controls can either reduce the likelihood of a breach or outage, or they can reduce the impact of a breach or outage. For those controls that reduce likelihood, the Weight is an estimate of the fraction of all breaches or outages that the control would either block or contain if the control were implemented to its fullest Degree, its fullest Scope and its fullest Management Sophistication. For those controls that reduce impact, it is an estimate of the fraction that the impact would be reduced by, if the control were implemented to its fullest Degree, its fullest Scope and its fullest Management Sophistication.

The product of Degree, Scope, and Management Sophistication is called the "Implementation Factor". The formula is as follows:

Implementation Factor=Degree*Scope*Management Sophistication

Degree is an estimate of the fraction of the maximum functionality that can possibly be implemented for this control (In Appendix G of their 2015 book *Enterprise Cybersecurity*, Donaldson, Siegel, Williams and Aslam describe a similar concept called a "Capability Value Scale", which is a number between 0.0 and 1.0). Scope is an estimate of the fraction of the applicable environment where this control is implemented. And Management Sophistication is a measure of how well the control is managed: whether it is documented, whether responsibility for the control has been clearly defined, and whether a supervisor makes regular checks that the control is operating as it should. A perfectly documented, assigned and supervised control has a Management Sophistication of 1. The Management Sophistication is reduced by customizable discount fractions, if the control is not documented, not assigned, or not supervised. The default discount fraction is 0.15 for each Management Sophistication factor. Here is the formula for Management Sophistication:

Management Sophistication=1−(Documentation Discount+Responsibility Discount+Oversight Discount)

As the input fields for each control are filled out, the KMS works in the background to calculate the expected score for the control, i.e., the maturity score that the Organization would be expected to reach for this control to mitigate its risk to a reasonable level. The expected score is calculated using the following formula:

Expected Score=Weight*Expected Degree

The Expected Degree is calculated as follows.

If the Priority Goal is "P1" then the user only needs to implement "P1" controls, so the degrees for all "P2" and "P3" controls will be zero, and the Organization is expected to implement all "P1" controls to the degree that will enable the Total Maturity Goal to be reached. Thus, the average degree required of "P1" controls is given by the formula:

$$\text{Expected } Degree_{P1} = \frac{\text{Total Maturity Goal}}{\sum_{i=1}^{I} w_i}$$

where $w_i$ is the weighting factor for "P1" control i, and there are I "P1" controls.

If the Priority Goal is "P2" then the user needs to implement "P1" and "P2" controls, so the degree for all "P3" controls will be zero, and the Organization is expected to implement all "P1" controls with a degree of 1 and all "P2" controls to the degree that will enable the Total Maturity Goal to be reached. Thus, the average degree required of "P2" controls is given by the formula:

$$\text{Expected } Degree_{P2} = \frac{\text{Total Maturity Goal} - \sum_{i=1}^{I} w_i}{\sum_{j=1}^{J} w_j}$$

where $w_j$ is the weighting factor for "P2" control j, and there are J "P2" controls.

If the Priority Goal is "P3" then the user needs to implement all controls ("P1", "P2", and "P3), and the Organization is expected to implement all "P1" and "P2" controls with a degree of 1, and all "P3" controls to the degree that will enable the Total Maturity Goal to be reached. Thus, the average degree required of "P3" controls is given by the formula:

$$\text{Expected } Degree_{P3} = \frac{\text{Total Maturity Goal} - \sum_{i=1}^{I} w_i - \sum_{j=1}^{J} w_j}{\sum_{k=1}^{K} w_k}$$

where $w_k$ is the weighting factor for "P3" control k, and there are K "P3" controls.

As the input fields for each control are filled out, the KMS also works in the background to color code the input fields. If the Control Level is "Unanswered" or "Not Implemented" then it is coded red. Otherwise, if the Control Level has been set to one of the predefined values "Basic" or "Intermediate", but the value of the control's Priority combined with the Control Level is lower than the Priority goal combined with the Control Level goal, then the Control Level is coded orange. See FIG. 11 and FIG. 12.

If the Scope of Implementation indicates that the control has been implemented through "Some" rather than "Most" or "All" of the applicable environment, then this input field is colored orange. Similarly, if any of the input fields Policy Documented, Responsibility Defined, or Oversight Exercised are set to "NO" then these fields are colored orange.

Finally, the KMS aggregates Control Scores whenever the user activates the dashboard. Scores are aggregated and normalized by Functional Area e.g. "Governance", by Primary Phase e.g. "Detect", by Control Category e.g. "Plan", and by combinations of Functional Area and Primary Phase e.g. "Endpoints" and "Identify", "Endpoints" and "Protect" etc. For each group a Total Maturity score is calculated using the formula:

$$TM_G = \frac{\sum_{i=1}^{n} (\text{Control Score})_i}{\sum_{i=1}^{n} (\text{Maximum Control Score})_i}$$

An overall Total Maturity score is also calculated for all controls using the formula:

$$TM_T = \frac{\sum_{i=1}^{n} (\text{Control Score})_i}{\sum_{i=1}^{n} (\text{Maximum Control Score})_i}$$

In the above formula for $TM_G$, (Control Score)$_i$ is either the Override Score for control i in Group "G" if this is non-zero (this occurs when the Control Level is "Compensating"), otherwise it is the Control Score for control i in Group "G", and n is the number of controls within group "G". If the Control Level for control i is "Not Applicable" then control i is not included in the calculation. If the "Control Level" for control i is "Unanswered", "Don't Know" or "Not Implemented" then (Control Score)$_i$ is set to zero. In the above formula for $TM_G$, (Maximum Control Score)$_i$ is the maximum possible value for (Control Score)$_i$, which, given the formula for Control Score, is simply the Weight for control i (in this case the Implementation Factor is 1). In the above formula for $TM_T$, both (Control Score)$_i$ and (Maximum Control Score)$_i$ are summed over N, the total count of all applicable controls (i.e. where Control Level is not "Not Applicable"), to produce an overall Total Maturity score for the assessment.

The overall Total Maturity score displayed in the KMS dashboard is color-coded according to customizable ranges based on how close the value is to the Total Maturity Goal. If the total score falls short of the goal, then the value on the dashboard is color coded red or orange. If it exceeds the goal, then it is color coded green or blue. More precisely, the KMS calculates the ratio of the total score to the goal and compares this to customizable thresholds e.g. 0.5 for red, 1 for orange, 1.5 for green. Thus, if the ratio is less than 0.5 then the score is colored red. If the ratio is greater than or equal to 0.5 but less than 1 then it is colored orange. If the ratio is greater than or equal to 1 but less than 1.5 it is colored green. Or, if it is greater than or equal to 1.5 then it is colored blue. This process is illustrated in FIG. 13.

A similar process is followed to color code the Total Maturity score for each group, except that the Total Maturity score for the group is compared against the Total Expected Maturity for the group, calculated by the formula:

$$TEM_G = \frac{\sum_{i=1}^{n} (\text{Expected Score})_i}{\sum_{i=1}^{n} (\text{Maximum Expected Score})_i}$$

where the Expected Score for control i is calculated using the formula:

Expected Score=Weight*Expected Degree

The Maximum Expected Score for control i is simply the Weight for control i (in this case the Expected Degree is 1).

The user can also use the "Slicers" feature on the dashboard to determine the overall and group Total Maturity scores for any combination of Functional Area, Primary Phase, and Control Category e.g. to examine the maturity of all technical controls which detect network and system security incidents the user would select the Primary Phases "Endpoints" and "Network, the Functional Area "Detect" and the Control Category "Technical".

Analyzing and Reporting

Once the seven questionnaires have been populated with answers and the assessor is happy with the scores assigned for all the compensating controls, the third phase of the KMS process is conducted by the assessor alone. This phase involves using the analysis and reporting features of the KMS and combining these with the assessor's own knowledge, experience, and targeted research to make an overall assessment of the organization's security posture. The primary goal of the assessment is to (1) determine whether the organization's cybersecurity maturity has reached the maturity goal consistent with its inherent risk, (2) if it has not, to quantify by how much the organization is short of its goal, and what components of its information security management program have the most gaps, and (3) to recommend and prioritize potential remediations of these gaps.

The assessment report needs to contain at a minimum the following five sections.

1. A description of the target of the assessment and its inherent risks. This section enumerates the organization's information assets, the threats to these assets, and the vulnerabilities that might be exploited to compromise the assets. To facilitate a comprehensive understanding of the target, it is highly recommended that an overview diagram be constructed outlining the organization's on-premise environment, its outsourced or hosted assets including backup and recovery sites, web presence and major cloud-based services, and its remote access and communication links to staff, partners, customers, and prospects. It is also recommended that this section include an analysis of all aspects of the organization's attack surface—technical, physical, and human.

2. An overview and breakdown of the results of the assessment. This section enumerates the overall maturity score for the assessment and compares this to the target score. See FIG. 14. It explains the concept of residual risk as a perfect score minus the actual score, and "notable" residual risk as the target score minus the actual score. This section then includes a detailed enumeration of the strengths and the weakness for each functional area of the assessment, from Governance through Awareness.

3. An analysis of the balance of the information security management program. This section looks at the maturity profile of the organization and the strengths and weaknesses of its maturity controls across the dimensions of function, lifecycle, and category. See FIG. 15. Aggregated Maturity scores are represented by colored bars. Expected Maturity scores are represented by gray bars. The aim is to ensure that the organization balances its investment in network security versus endpoint security, preventive controls versus detective controls, administrative controls versus technical controls etc. The maturity profile identifies areas of both underinvestment and overinvestment. It gives management an overview of its security portfolio and helps to highlight opportunities to rebalance.

4. A prioritized list of recommendations for addressing notable gaps. In this section the assessor uses the KMS' prioritization algorithms and her own expert judgment to list and prioritize new and improved controls that will provide the biggest return on investment and also answer the normative questions "where do we start?" and "when have we done enough?". This involves a consideration of the tradeoffs between achieving compliance/satisfying industry norms, maximizing security effectiveness to prevent and thwart attacks, and minimizing total cost of ownership in terms of money, people, and time. To jumpstart this analysis the KMS worksheet "Notable Gaps" automates the identification and quantification of notable gaps when the user clicks on the "Refresh" button. Gaps are groups (functional areas, lifecycle phases, or security categories) for which the Aggregated Maturity does not reach the Expected Maturity.

The Aggregated Maturity is calculated as follows:

Aggregated Maturity$_G = \Sigma_{i=1}^n$(Control Score)$_i$

The Expected Maturity is calculated as follows:

Expected Maturity$_G = \Sigma_{i=1}^n$(Expected Score)$_i$

The size of the gap is quantified using the formula:

Gap Size$_G$ = Expected Maturity$_G$ - Aggregated Maturity$_G$

For each gap, the KMS automatically creates a prioritized list of control shortfalls, which, when remediated, will bring the Aggregated Maturity for the group up to or beyond the Expected Maturity. A shortfall is the amount by which a Control Score falls short of its Expected Score. The order of the prioritized list depends upon the setting of the parameter "Remediation Sequence" in the User Profile:

The default is "Custom", indicating that customary expectations take preference over efficacy i.e. controls with priority "P1" are expected to be implemented before controls with priority "P2", which are expected to be implemented before controls with priority "P3"; within each priority level, controls with the larger shortfall take precedence, since improvements to these controls will bring the biggest increase in security effectiveness.

If the parameter is set to "Efficacy" then controls are simply ordered according to the size of the shortfall, those with larger shortfalls taking precedence.

The size of the shortfall for selected controls is subtracted from the size of the gap until the gap has been remediated.

Note that since neither of the remediation sequences takes account of the cost of implementing the control, the assessor may modify the recommended list of control improvements for each gap after taking account of the ROI or TCO of the control, and/or the components of TCO: Resistance, Upfront Cost, and Ongoing Cost. See Table 7 Control Prioritization.

5. An executive summary. This two-page section summarizes results, major risk factors, the strengths and weaknesses of the security program, and top recommendations.

In addition to delivering the written assessment report in encrypted format (e.g. by emailing a password-protected pdf file and communicating the password via text message), it is recommended that the assessor schedule an executive briefing to bring all the key players together to present the findings and recommendations. This can be a type of forcing function to force disparate parts of the organization to communicate and take ownership of the remediation plan. It is not unusual to have a senior partner propose a cybersecurity internal audit but delegate the specifics to his IT department, which may or may not be enthusiastic about the project. Having all the key players on a conference call or in a meeting to discuss the assessment results and recommendations can expedite the process of internal communication.

In an example, the KMS comprises a data model that comprises a user profile, inherent risk, and control maturity.

The Technology Data Model

The User Profile

The KMS User Profile allows the user to customize parameters used in Excel formulae and VBA procedures. General parameters include the name of the company, the industry or sector, and where to store temporary files and the error log. Scoring parameters pertain to the values assigned to the scope of controls and to the management attributes related to control policy, responsibility, and oversight. Management parameters pertain to the per-function defaults for scope, policy, responsibility, and oversight. Color defaults pertain to the lower and upper index ranges for the red, orange, green and blue colors for control maturity on the Dashboard. Cost defaults pertain to the weightings given to each value in the cost scale used in calculating Total Cost of Ownership. And Gap parameters pertain to the prioritization of notable gaps and controls. Descriptions and factory defaults for the parameters are shown in Table 2 Customizable Parameters used in the KMS.

TABLE 2

Customizable Parameters used in the KMS

| Parameter | Type | Description | Factory Default |
|---|---|---|---|
| Company Name Long | General | Full name of the organization being assessed. Appears on the Dashboard. | DEWEY CHEATEM & HOWE LLP |
| Company Name Short | General | Abbreviated name of the organization being assessed. Appears on report headings. | Dewey |
| Sector or Industry | General | The principal economic sector or industry segment in which the Organization is active. | Legal |

TABLE 2-continued

Customizable Parameters used in the KMS

| Parameter | Type | Description | Factory Default |
|---|---|---|---|
| Directory for Temporary Files | General | The name of the Windows directory where temporary report files are created. | Value of Windows environment variable % TMP % |
| Directory for Report Files | General | The name of the Windows directory where report files are stored. | Value of Windows environment variable % TMP % |
| Error Log File | General | The name of the file where the KMS VBA error messages are logged. | % TMP %\ CyberGaps_Error_Log.txt |
| Scope Factor Don't Know | Scoring | Value to multiply score when user does not know the scope of the control | 0.00 |
| Scope Factor All | Scoring | Value to multiply score when user sets the scope of the control to "All" | 1.00 |
| Scope Factor Most | Scoring | Value to multiply score when user sets the scope of the control to "Most" | 0.75 |
| Scope Factor Some | Scoring | Value to multiply score when user sets the scope of the control to "Some" | 0.25 |
| Scope Factor Not Applicable | Scoring | Value to multiply score when user sets the scope of the control to "Not Applicable" | 1.00 |
| Scope Factor Not Implemented | Scoring | Value to multiply score when user sets the scope of the control to "Not Implemented" | 0.00 |
| No Policy Discount NA | Scoring | Value to discount score when the No Policy Discount is set to "Not Applicable" | 0.00 |
| No Policy Discount NO | Scoring | Value to discount score when the No Policy Discount is set to "NO" (no policy in place) | 0.15 |
| No Policy Discount YES | Scoring | Value to discount score when the No Policy Discount is set to "YES" (policy is in place) | 0.00 |
| No Resp Discount NA | Scoring | Value to discount score when the No Resp Discount is set to "Not Applicable" | 0.00 |
| No Resp Discount NO | Scoring | Value to discount score when the No Resp Discount is set to "NO" (no responsibility assigned) | 0.15 |
| No Resp Discount YES | Scoring | Value to discount score when the No Resp Discount is set to "YES" (responsibility is assigned) | 0.00 |
| No Over Discount NA | Scoring | Value to discount score when the No Over Discount is set to "Not Applicable" | 0.00 |
| No Over Discount NO | Scoring | Value to discount score when the No Over Discount is set to "NO" (no oversight is exercised) | 0.15 |
| No Over Discount YES | Scoring | Value to discount score when the No Over Discount is set to "YES" (oversight is exercised) | 0.00 |
| Governance Scope | Management | Default scope factor for Governance controls | All |
| Governance Policy | Management | Default No Policy Discount for Governance controls | Not Applicable |
| Governance Responsibility | Management | Default No Resp Discount for Governance controls | YES |
| Governance Oversight | Management | Default No Over Discount for Governance controls | NO |
| Endpoints Scope | Management | Default scope factor for Endpoints controls | Most |
| Endpoints Policy | Management | Default No Policy Discount for Endpoints controls | NO |
| Endpoints Responsibility | Management | Default No Resp Discount for Endpoints controls | YES |
| Endpoints Oversight | Management | Default No Over Discount for Endpoints controls | NO |
| Network Scope | Management | Default scope factor for Network controls | All |
| Network Policy | Management | Default No Policy Discount for Network controls | NO |
| Network Responsibility | Management | Default No Resp Discount for Network controls | YES |
| Network Oversight | Management | Default No Over Discount for Network controls | NO |
| Access Scope | Management | Default scope factor for Access controls | Most |
| Access Policy | Management | Default No Policy Discount for Access controls | NO |
| Access Responsibility | Management | Default No Resp Discount for Access controls | YES |
| Access Oversight | Management | Default No Over Discount for Access controls | NO |
| Data Scope | Management | Default scope factor for Data controls | Most |
| Data Policy | Management | Default No Policy Discount for Data controls | NO |
| Data Responsibility | Management | Default No Resp Discount for Data controls | YES |
| Data Oversight | Management | Default No Over Discount for Data controls | NO |
| Dependencies Scope | Management | Default scope factor for Dependencies controls | Most |
| Dependencies Policy | Management | Default No Policy Discount for Dependencies controls | Not Applicable |

TABLE 2-continued

Customizable Parameters used in the KMS

| Parameter | Type | Description | Factory Default |
|---|---|---|---|
| Dependencies Responsibility | Management | Default No Resp Discount for Dependencies controls | YES |
| Dependencies Oversight | Management | Default No Over Discount for Dependencies controls | NO |
| Awareness Scope | Management | Default scope factor for Awareness controls | All |
| Awareness Policy | Management | Default No Policy Discount for Awareness controls | Not Applicable |
| Awareness Responsibility | Management | Default No Resp Discount for Awareness controls | YES |
| Awareness Oversight | Management | Default No Over Discount for Awareness controls | NO |
| Blue Lower | Color | Lower bound of score/goal for color blue | 1.25 |
| Green Lower | Color | Lower bound of score/goal for color green | 1.00 |
| Green Upper | Color | Upper bound of score/goal for color green | 1.25 |
| Orange Lower | Color | Lower bound of score/goal for color orange | 0.75 |
| Orange Upper | Color | Upper bound of score/goal for color orange | 1.25 |
| Red Upper | Color | Upper bound of score/goal for color red | 0.75 |
| Cost High | Cost | Value for cost high | 7.00 |
| Cost Low | Cost | Value for cost low | 1.00 |
| Cost Medium | Cost | Value for cost medium | 4.00 |
| Cost None | Cost | Value for cost none | 0.00 |
| Cost Very High | Cost | Value for cost very high | 10.00 |
| Remediation Sequence | Gap | How the KMS should prioritize the remediation of gaps - customary expectation or security efficacy. | Custom |

Inherent Risk

Inherent risk is the intrinsic likelihood and potential impact of a compromise of an organization's information security before it has implemented any security controls. Inherent risk is assessed by completing a multiple-choice questionnaire. There is a separate questionnaire for each major sector of the economy. The KMS displays the appropriate questionnaire (in red) for the specific sector chosen by the user in the User Profile. Each question corresponds to a specific risk factor. With the help of the KMS assessor, the organization answers each question by choosing from a set of three possible answers. Each answer corresponds with a predefined level of risk: minimal, moderate or significant. The questions or risk factors in the Inherent Risk questionnaire are grouped into risk categories. See FIG. 16 for an entity relationship diagram.

The KMS calculates a Risk Score for each risk factor as follows. The KMS uses a lookup table to assign a Risk Rating for a specific risk factor according to the risk level chosen (minimal, moderate, or significant). This is an index value between 0.0 and 1.0. The index value for a level of "significant" is typically 1.0. To calculate the Risk Score, the KMS simply multiplies the assigned Risk Rating by a Weight that is predetermined for this risk factor relative to other risk factors in the same risk category. Weights are predetermined by the developer, but the KMS assessor may amend the weights if required, as long as she is careful to log such amendments and use the same settings if conducting a reassessment.

The KMS sums the Risk Scores for all risk factors in the category and then calculates a normalized Category Risk Score by dividing this sum by the sum of the Maximum Risk Scores for each risk factor in the category, which corresponds to a Risk Level of "Significant" for all risk factors in the category. Here is the formula:

$$R_C = \frac{\sum_{i=1}^{n} w_i r_i}{\sum_{i=1}^{n} w_i \max(r_i)}$$

$R_c$ is the normalized inherent risk score for category "C", $w_i$ is the Weight of risk factor i relative to other risk factors in the same category, $r_i$ is the Risk Rating for risk factor i, and $\max(r_i)$ is the maximum Risk Rating for risk factor i.

Table 3 Risk Factor lists all the fields related to the Risk Factor entity. Fields are either base (assigned by the developer), input (by the user), derived (from a combination of user input plus base fields or lookup tables), or calculated (from a combination of other fields plus lookup tables).

TABLE 3

Risk Factor

| Field | Description | Values |
|---|---|---|
| Risk Factor | The name of the risk factor (base) | e.g. "Client Wealth" |
| Risk Question | The question the assessor asks to assess the level of risk for this factor (base) | e.g. "How large are your clients?" |
| Risk Category | The category or grouping to which this risk factor belongs (base) | Clients, Data, Media, Staff, Third Parties, Facilities, IT Infrastructure, Applications, or Threats |
| Risk Level | The level of inherent risk the organization carries for this factor (input) | "Unanswered", "1 - Minimal", "2 - Moderate" or "3 - Significant" |
| Minimal | Multiple choice answer pertaining to a minimal level of risk (base) | e.g. "Our clients are all nano-cap (less than $50 M market capitalization)" |

TABLE 3-continued

Risk Factor

| Field | Description | Values |
|---|---|---|
| Moderate | Multiple choice answer pertaining to a moderate level of risk (base) | e.g. "Our clients include small-cap ($50 M to $2 B) and/or mid-cap ($2 B to $10 B)" |
| Significant | Multiple choice answer pertaining to a significant level of risk (base) | e.g. "Our clients include large cap (more than $10 B) or members of the FT Global 500 or the Fortune Global 500" |
| Risk Rating | The rating assigned to the risk factor corresponding to the Risk Level selected (derived) | A number with one decimal place between 0.0 and 1.0 e.g. 0.3 |
| Risk Rating Minimal | The predefined rating for a Risk Level of "1 - Minimal" (base) | e.g. 0.1 |
| Risk Rating Moderate | The predefined rating for a Risk Level of "2 - Moderate" (base) | e.g. 0.3 |
| Risk Rating Significant | The predefined rating for a Risk Level of "3 - Significant" (base) | e.g. 1.0 |
| Weight | The weighting factor for this Risk Factor relative to other Risk Factors in the same Risk Category (base) | e.g. within the Risk Category "Clients" the Risk Factor "Client Wealth" may have a Weight of 2, while the Risk Factor "Client Industry" may have a weight of 4. This would indicate that an organization is twice as likely to be targeted because of its industry sector than because of its size. |
| Risk Score | Amount that this Risk Factor contributes to overall Risk Score for the Risk Category. This is the product of the Risk Rating * the Weight (Calculated). | e.g. 0.3 * 4 = 1.2 |
| Maximum Risk Score | The Risk Score for a Risk Level of "3 - Significant". | e.g. 1.0 * 4 = 4.0 |

Risk factors are grouped into nine categories: Clients, Data, Media, Employees, Third Parties, Facilities, IT Infrastructure, Applications, and Threats. Normalized inherent risk scores are calculated for the first eight categories and are displayed graphically in the KMS Inherent Risk Profile. No Risk Scores are calculated for the Threats category, since a lack of recent attacks may be an indication of poor detection capabilities rather than a true absence of attacks. The questions in this category are intended to stimulate discussion of security awareness and response readiness, and to introduce the advantages of "cloaking" or attorney-client privilege in a post-breach scenario.

See FIG. 17 for an example profile. Note that the scores for "Clients" and "Data" are proxy measures of both the threat and consequence components of risk. "Media" acts as a multiplier for advanced threats. The other risk factor categories—"Staff", "3rd Parties", 'Facilities", "IT Infrastructure", and "Applications"—provide proxy measures for the vulnerability component of risk. This risk ontology is depicted in FIG. 18.

Based on a simplified probabilistic risk calculation the total inherent risk score is calculated using the formula:

$$R_{Total} = Pr(c)C = TVC$$

The total risk is the probability of a consequence, Pr(c), times the magnitude of the consequence, C. The probability of a consequence is the probability of a threat event, T, times the probability that the threat successfully exploits a vulnerability, V. This is a simplification of probabilistic risk, which is accumulated over all threat-asset pairs i.e.

$$R_{Total} = \Sigma_{i=1}^{n} t_i v_i c_i$$

The KMS models the probability of a threat event as being proportional to the Risk Scores for Clients and for Data. The wealthier the clients of an Organization are and the more monetizable the data that it stores, the more likely the Organization will be attacked. The KMS estimates that 50% of the threat pertains to opportunistic attacks that are amplified by some kind of media exposure. Hence the formula for the probability of a threat event, T:

$$T = \frac{(R_{Clients} + R_{Data})}{2} * (0.5 + 0.5 * R_{Media})$$

The KMS models the probability that a threat will successfully exploit a vulnerability (V) as being proportional to the Risk Scores for Staff, $3^{rd}$ Parties, Facilities, IT infrastructure, and Applications. Collectively these scores account for the size of the attack surface (physical, human and virtual), as well as its complexity and susceptibility to attack:

In terms of Staff, high turnover, liberal BYOD policies, frequent remote access, and lack of restrictions on the use of personal cloud services can all increase the risk of information compromise.

In terms of $3^{rd}$ Parties, outsourcing business services, relying on ISPs and MSPs, and extensive use of cloud services all carry risk.

In terms of Facilities, the more offices and data centers, the higher the risk of attack, and some geographies are higher risk than others.

In terms of IT Infrastructure, the higher the internet and wireless exposure, the flatter the corporate network, the higher the reliance on simple email mechanisms, the more dated and also more bleeding edge the technology is, and the higher the adoption of certain operating systems, the higher the risk of information compromise.

In terms of Applications, custom-built software, a high number of commercial software packages, and the use of certain popular desktop applications all create higher risk of exploitation by adversaries.

The Vulnerability component of inherent risk is modeled simply as the sum of the Risk Scores for these five categories:

$$V = R_{Staff} + R_{3rd\ parties} + R_{Facilities} + R_{IT\ Infrastructure} + R_{Applications}$$

Finally, the KMS models the magnitude of the potential Consequence of a successful attack as being proportional to the Risk Scores for Clients and for Data. The wealthier the clients of an Organization are and the more monetizable the data that it stores, the more consequential the impact of an attack is likely to be. Here is the formula for consequence:

$$C = \frac{(R_{Clients} + R_{Data})}{2}$$

To calculate the normalized total inherent Risk Score, the KMS takes the cube root of the product of T, V, and C.

Adapting the formula for simplified probabilistic risk, $R_{Total}$, therefore, gives us the final formula:

$$R_{Total} = \sqrt[3]{(TVC)}$$

where T, V, and C are derived using the individual formulae above.

Control Maturity

The basic entity for the control maturity component of the KMS is the control. Controls can be grouped by function, sub-function, phase or category. Controls which are implemented can be implemented at one of three predefined levels described by a declarative statement. See the entity-relationship diagram in FIG. 19.

The control entity has several fields, which are either base (assigned by the developer), input (by the user), derived (from a combination of user input plus base fields or lookup tables), or calculated (from a combination of other fields plus lookup tables). Table 4 Control Categorization describes all base fields that help to categorize the control entity.

TABLE 4

Control Categorization

| Field | Description | Values |
|---|---|---|
| Control Name | The name of the control | e.g. "Ransomware Response Plan" |
| Base Description | Description of the control | e.g, "Outline responsibilities and procedure for identifying and responding to a ransomware attack" |
| Primary Phase | The most relevant phase from the extended NIST model to which the control applies. The NIST Cybersecurity Framework consists of five "Functions" - Identify, Protect, Detect, Respond, Recover. These are called "Phases" in the KMS, which splits Protect into Prevent and Limit, based on the categorization used by the Australian Signals Directorate. See *Strategies to Mitigate Cyber Security Incidents*, February 2017. | Identify, Prevent, Limit, Detect, Respond, or Recover |
| Functional Area | The security function to which the control belongs | Governance, Endpoints, Network, Access, Data Dependencies, Awareness |
| Sub Function | The sub function or control group to which the control belongs | Access, Administrators, Antimalware, Architecture, Auditing, Authentication, Cloud, Communication, Compliance, Continuity, Contract, DDoS, Development, Disposal, DLP, Email, Encryption, Financial, Firewall, Hardening, Inventory, Knowledge, Mobile, Monitoring, OS, Physical, Privacy, Proxy, Remote Access, Risk Management, Segmentation, Sharing, SOC, Software, Staff, Vulnerability Management, Web, Wireless |
| Control Category | The category to which the control belongs | Plan, Policy, Procedure, Resource, Technical |
| Industry | Specific industry to which the control applies | Generic, Legal Firms, Financial Advisors, Non-Profit etc. |
| Priority | The priority of the control. This establishes the chronological order in which the control should be implemented. P1 should be implemented before P2. P2 should be implemented before P3. Only controls whose priority is less than or equal to the priority goal are included. Other controls are not shown. | Currently P1, P2, or P3. Priority is set according to the total inherent risk score. The maturity model includes selection maturity and implementation maturity. Organizations with higher risk will be expected to select more controls, according to industry norms reflected in common regulations such as PCI-DSS and decisions made by |

TABLE 4-continued

Control Categorization

| Field | Description | Values |
|---|---|---|
| | | regulatory authorities such as the SEC, FTC etc. The concept is akin to the "security control baselines" in NIST SP 800-53, which describe an appropriate selection of controls for low-impact, moderate-impact, and high-impact information systems. See NIST SP 800-53 Rev 4, Appendix D. |

Table 5 Control Level describes all base fields that enumerate the different levels at which the control can be implemented: L0=Unanswered, L1=Don't Know, L2=Not Applicable, L3=Not Implemented, L4=Basic, L5=Intermediate, L6=Advanced, LX=Compensating. A level of compensating can be assigned to a control for which none of the predefined levels applies, but there is still some level of protection in place. Each level is associated with a numerical value between 0 and 1 indicating the degree of functionality implemented. When the control is not implemented, the degree is 0. When it is implemented to the fullest extent, the degree is 1. Levels are cumulative i.e. higher levels include the functionality of the levels below. For whitelisting, for example:

- If the control is not implemented, the description for field "L3—Not Implemented" is "Permit all, deny-by-exception" and the degree L3 is 0.00.
- If the control is implemented at a level of "Basic", the description for field "L4—Basic" is "Only allow executables in specific directories" and the degree L4 is 0.50. This implies that 50% of malware can be stopped with a simple implementation of whitelisting. Typical functionality at this level includes checking filenames, and perhaps file lengths, but not cryptographic hashes or digital signatures. The other 50% assumes that the malware is being deployed by persistent adversaries who will find a way around this simple implementation of whitelisting.
- If the control is implemented at a level of "Intermediate", the description for field "L5—intermediate" is "Enable OS or EPP application control", and the degree L5 is 0.75. This implies an operating system solution like Microsoft AppLocker or DeviceGuard, or the application control capabilities of an Endpoint Protection Platform such as Symantec Endpoint Protection, and that these technologies will be able to thwart 75% of malware. Typical functionality at this level includes cryptographic checks and a vendor-maintained whitelist. 25% of malware will still get through if deployed by advanced and persistent adversaries.
- If the control is implemented at a level of "Advanced", the field "L6—Advanced" is $3^{rd}$ party application control" with a degree L6 of 1.00. This implies a dedicated full-function application control solution such as Carbon Black "CB Protection". Typical functionality at the highest level includes cryptographic checks and a dedicated whitelist maintained by the organization itself, perhaps as a supplement to vendor-maintained whitelists.

TABLE 5

Control Level

| Field | Description | Values |
|---|---|---|
| L3 - Not Implemented | Declarative statement regarding the lack of this control. | e.g. "We do not have a dedicated ransomware response plan" |
| L4 - Basic | Declarative statement describing the lowest implementation level. | e.g. "Responsibility for handling an incident clear, timely access to specialist resources arranged, responsibility for deciding whether to pay clear" |
| L5 - Intermediate | Declarative statement describing the intermediate level of implementation. | e.g. "Staff are instructed on whom to contact - day or night - and to disconnect computers suspected of infection from corporate and wireless networks" |
| L6 - Advanced | Declarative statement describing the advanced level of implementation. This is the most advanced implementation. | e.g. "Steps to ascertain scope of infection, restore from backup, try to decrypt, and/or negotiate/pay are outlined" |
| L0 | Degree if implemented at level 0 (Unanswered) | 0 |
| L1 | Degree if implemented at level 1 (Don't Know) | 0 |
| L2 | Degree if implemented at level 2 (Not Applicable) | 0 |
| L3 | Degree if implemented at level 3 (Not Implemented) | 0 |
| L4 | Degree if implemented at level 4 (Basic) | e.g. 0.35 |

TABLE 5-continued

| | Control Level | |
|---|---|---|
| Field | Description | Values |
| L5 | Degree if implemented at level 5 (Intermediate) | e.g. 0.65 |
| L6 | Degree if implemented at level 6 (Advanced) | e.g. 1.0 |
| LX | Degree if implemented at level X (Compensating) and no override value is specified | e.g. 0.5 |

Table 6 Implementation Guidance lists all basic fields that provide implementation guidance for the control.

TABLE 6

| | Implementation Guidance | |
|---|---|---|
| Field | Description | Values |
| Implementation Tips | Advice on how to implement the control including what has worked for others, do's and don'ts, pitfalls etc. | e.g. "Disconnect infected computer immediately. Run an offline (e.g. USB drive or bootable disc) virus scan to drive and remove the virus; determine scope of infection (shared drives, external hard drives, USB storage, network storage, cloud storage); determine ransomware strain and look for decryptors on sites like bleepingcomputer.com and nomoreransom.org; locate backups and verify integrity; restore from backup; arrange Bitcoins in advance just in case; escalate to law enforcement; lessons learned". |
| How to Bypass | What an attacker might do to get around this control (not public) | e.g. for whitelisting enforcement, "name and size checks easily circumvented; criminals can steal private certificates if they hack into vendors, thereby gaining a fake id to sign their malware" |
| NIST 800-53 Rev4 | Freeform list of relevant controls from NIST SP 800-53 Revision 4 (not public) | e.g. for Power Surge or Loss, "PE-11 (Emergency Power), PE-9 (2) Voltage Control" |
| Best NIST 800-53 Rev4 | Precise reference to the most relevant control from NIST SP 800-53 Revision 4 used to look up NIST documentation | e.g. "PE-11" |
| Best CSC 6.1 | Precise reference to the most relevant control from SANS/CIS Critical Security Controls version 6.1 | e.g. for Whitelisting Enforcement "2.1" |
| Other References | References or citations to other guidance or relevant publications | e.g. for Whitelisting Enforcement "NIST SP 800-167 Guide to Application Whitelisting; ASD Strategies 2017" |
| Internal References | References or citations to other guidance or relevant publications (not public) | e.g. for Whitelisting Enforcement, "ILTA Peer - Security Best Practices, Mar. 31, 2017" |
| Solution 1 | First recommendation for product or service to help implement this control | e.g. "Carbon Black Protection (Bit9)" |
| Solution 2 | Second recommendation for product or service to help implement this control | e.g. "Microsoft AppLocker and DeviceGuard" |
| Solution 3 | Third recommendation for product or service to help implement this control | e.g. "McAfee ePolicy Orchestrator" |
| Others | Other recommendations for product or service to help implement this control | e.g. "Symantec, Trend Micro, CyberArk, Check Point, Digital Guardian, AppSense, HEAT (Lumension), Arellia" |

The final group of base fields relevant to the control entity are those used for prioritizing the controls. They involve the benefits and costs of the control and are shown in Table 7 Control Prioritization.

TABLE 7

Control Prioritization

| Field | Description | Values |
|---|---|---|
| Weight | A measure of the inherent effectiveness of the control. For likelihood reducing controls, it is an estimate of the fraction of breaches or outages that the control would block or contain, if it were implemented to its fullest degree (1.0), to its fullest scope (1.0), and to its fullest management sophistication (1.0). For impact reducing controls it is an estimate of what fraction the impact would be reduced by, if it were implemented to its fullest degree (1.0), to its fullest scope (1.0), and to its fullest management sophistication (1.0). See Table 9 Derived and Calculated Control Fields for an explanation of degree, scope and management sophistication. | Between 0.00 and 1.00. Typical values do not exceed 0.50 e.g. the most effective technical control based on the Verizon DBIR 2017 was whitelisting: 51% of breaches involved malware, so we can say that the likelihood for just over half of all breaches will be reduced to some extent by implementing this control. The KMS does not quantify how much the likelihood is reduced by, only the fraction or percentage of breaches for which the likelihood is reduced, relative to other controls. The KMS measures relative risk reduction for the purposes of prioritization of effectiveness. In terms of the FAIR ontology, the KMS measures the reduction in the loss event frequency of a control relative to the reduction of the loss event frequency of other controls. |
| Weight Type | Whether this control reduces likelihood or impact. Although some controls reduce both likelihood and impact, for simplicity, only the dominant type of reduction is chosen. The weight is increased to account for controls for which both likelihood and impact are reduced. For those controls that both reduce the likelihood and the impact of breaches or outages, the weight is increased (e.g. by 25%). | Likelihood or Impact. |
| Resistance | A simple ordinal measure of the resistance that is likely to be generated from staff when this control is implemented. The ASD calls this "Potential User Resistance". See Australian Signals Directorate, *Strategies to Mitigate Cyber Security Incidents*, February 2017. | None, Low, Medium, High, Very High |
| Upfront Cost | A simple ordinal measure of the cost of implementing the control. This might include product purchase costs, staff involvement, training etc. The ASD lists "staff, equipment, technical complexity". | None, Low, Medium, High, Very High |
| Ongoing Cost | A simple ordinal measure of the cost of maintaining the control. This might include staff, product maintenance, upgrades, updates etc. The ASD notes that this is "mainly staff". | None, Low, Medium, High, Very High |
| TCO | A measure of the total cost of ownership of the control, derived from Resistance (R), Upfront cost (U), and Ongoing Cost (O) as follows: first, numerical values are assigned using the lookup table (configurable in the User Profile) - | Ranges from 0.00 to 25.00 |

| Cost Level | Cost |
|---|---|
| High | 7.00 |
| Low | 1.00 |
| Medium | 4.00 |
| None | 0.00 |
| Very High | 10.00 |

| | | |
|---|---|---|
| | then TCO is calculated using the formula: TCO = R/2 + U + O Staff resistance is not weighted as heavily as hard financial costs. | |
| ROI | A measure of the return on investment of the control. This is sometimes called the ROSI value (Return on Security Investment). Hubbard calls it the "return on risk mitigation" or the "return on control" and enumerates it as the monetized value of the reduction in expected losses divided by the cost of the control. See Douglas W. | Ranges theoretically from 100*0.01/25 i.e. 0.04 to 100*1/0.5 i.e. 200. Typically, does not exceed 20. |

TABLE 7-continued

Control Prioritization

| Field | Description | Values |
|---|---|---|
| | Hubbard and Richard Seiersen, *How to Measure Anything in Cybersecurity Risk* (Hoboken, NJ: Wiles, 2016), p. 8, pp. 51-53. ROI is calculated as: ROI = 100 * Weight/TCO. | |

Table 8 Control User Input lists those fields that are input by the user.

TABLE 8

Control User Input

| Field | Description | Values |
|---|---|---|
| Control Level | The level at which the control is implemented. To remove this control from the assessment altogether choose "Not Applicable". To include the control in the assessment, either choose one of the predefined levels (Basic, Intermediate, Advanced), or Compensating. | Unanswered, Don't Know, Not Applicable, Not Implemented, Basic, Intermediate, Advanced, Compensating |
| Scope of Implementation | Over how much of the applicable environment has this control been implemented | Over Some applicable areas, Most applicable areas, or All applicable areas e.g. for governance the options are "Implemented for Some Departments", "Implemented for Most Departments", "Implemented for All Departments". |
| Policy Documented | Is there a written policy and/or procedure for this control? | YES or NO |
| Responsibility Defined | Has accountability for this control been properly assigned and written into job descriptions? | YES or NO |
| Oversight Exercised | Is the effectiveness of this control being measured and reported on? | YES or NO |
| Compensating Control | When the Control Level is set to "Compensating" this field provides a description of the compensating control | e.g. a compensating control for encryption at rest might be "Tokenization of sensitive data" |
| Compensating Score | This is a user-defined product for Weight * Degree. Cannot exceed the predefined weight. | e.g. 0.24 |

Finally, Table 9 Derived and Calculated Control Fields lists derived or calculated fields.

TABLE 9

Derived and Calculated Control Fields

| Field | Description | Values |
|---|---|---|
| Degree | The degree of functionality implemented for this control. The degree is derived from the value of L0, L1, L2, L3, L4, L5, L6, or LX using a lookup table. L0, L1 etc. is set according to the Control Level set by the user. | From 0.00 to 1.00 |
| Scope | The fraction of all applicable areas where the control is implemented. This field is derived from the customizable parameter Scope of Implementation. Numerical values are assigned using lookup tables. The following table shows the lookups for governance controls (other terminology is used for other functions such as endpoints, network etc.). | 0.00, 0.25, 0.75, 1.00 (configurable in the User Profile) |
| | Scope of Implementation | Scope Factor |
| | Don't Know | 0 |
| | Implemented for All Departments | 1 |

TABLE 9-continued

Derived and Calculated Control Fields

| Field | Description | Values |
|---|---|---|
| | Implemented for Most Departments | 0.75 |
| | Implemented for Some Departments | 0.25 |
| | Not Applicable | 1 |
| | Not Implemented | 0.00 |
| Management Sophistication | This is an interim variable not stored separately as a field. It is derived from the customizable parameters for "Policy Documented", "Responsibility Defined," and "Oversight Exercised". It measures how sophisticated the management of this control is in practice, according to how well it is documented, assigned, and supervised. For each input field there is a corresponding discount set as 0.00 for YES or 0.15 for NO. The KMS uses a separate discount value for each management sophistication factor, which can be customized in the User Profile. Sophistication is then calculated as: Sophistication = 1 − (Documentation Discount + Responsibility Discount + Oversight Discount) If none of the sophistication factors is in place (all input fields are NO), then, by default, the control is estimated to be only half as effective. To be precise, 0.55 times as effective (1 − 0.15 − 0.15 − 0.15) using default discounts. This is subjective. Well-documented and enforced policies increase awareness and vigilance, thereby reducing careless behavior by staff. A significant percentage of breaches are caused by a combination of insider carelessness and an external threat. Well-documented and enforced policies also create "stickiness" (continuity) and predictability in the face of change e.g. when an IT employee leaves, the new hire knows what security tasks she needs to perform and how to carry them out by referring to written policy. | 0.55, 0.70, 0.85 or 1.00 |
| Implementation Factor | This is an interim variable not stored separately as a field. It is derived from the Degree, the Scope, and the Management Sophistication and is simply: Implementation Factor = Degree * Scope * Management Sophistication | From 0.00 to 1.00 |
| Score | A measure of the realized effectiveness of the control. For likelihood reducing controls, this is an estimate of the fraction of breaches or outages that the control actually blocks or contains in practice. For impact reducing controls it is an estimate of what fraction the impact is actually reduced by in practice. The realized effectiveness takes into account how much of the total possible functionality of the control is implemented (degree), how widely it is implemented (scope), and how well it is implemented (management sophistication). The formula for the realized effectiveness or Score is simply: Score = Weight * Implementation Factor = Weight * Degree * Scope * Management Sophistication | From 0.00 to 1.00 |
| Override Score | When the user chooses "Compensating" for Control Level the formula for the score becomes: Override Score = Compensating Score * Scope * Management Sophistication | From 0.00 to 1.00 |

In an example, the KMS employs a workbook with several worksheets. Some worksheets are visible to the user and others are hidden. The workbook also includes several hidden event-driven programming language procedures and functions. In a non-limiting example the spreadsheet is Microsoft Excel and the event-driven programming language is Microsoft Visual Basic.

How the Technology Uses Excel

Overview

The KMS is a Microsoft Excel Workbook with several worksheets, some visible and some hidden, and several hidden Visual Basic procedures and functions. FIG. 20 shows the flow of data between the worksheets.

Visible worksheets have a colored or white background. The worksheet in red is the Inherent Risk Profile questionnaire. There is one question per risk factor. The fields pertaining to risk factors are listed in Table 3 Risk Factor. The worksheets in green are the seven control maturity questionnaires. There is one question per control. The input fields pertaining to control maturity are listed in Table 8 Control User Input. The informational fields are listed in Table 4 Control Categorization through Table 7 Control Prioritization. There are four worksheets shown in white. The first is the Control Book, which shows all the informational fields for an individual control, as well as the input fields which can be used to answer the maturity question pertaining to that control. The second is the Dashboard, which shows the aggregated inherent risk and maturity scores as well as the top gaps, and which enables the user to create a report. The third is the Profile, which allows the user to customize parameters such as the company name, default scoring values, color ranges etc. The fourth is Notable Gaps, which shows a list of functional areas, lifecycle phases, and security categories (and associated control shortfalls) for which Aggregate Maturity does not reach Expected Maturity, along with associated controls for which the Control Score falls short of the Expected Score.

Hidden worksheets have a dotted background. There is one Base worksheet for each functional area which consists of the knowledge base for the controls in this area. The knowledge base is composed of developer-assigned, values for informational fields that help to categorize the control, enumerate the different levels at which the control can be implemented, provide implementation guidance for the control, and prioritize the control based on the benefits it provides and the costs it incurs. These informational fields are described in Table 4 Control Categorization through Table 7 Control Prioritization.

The hidden CSC 6.1 and NIST 800-53 Rev 4 worksheets contain the documentation for the CIS Critical Security Controls Version 6.1 and the NIST Special Publication 800-53 controls Revision 4. This documentation is available via cell comments in the Control Book. The hidden Active Control worksheet is used to keep track of which control the user is currently viewing in the control maturity worksheets, so that if the user clicks on the control, the Control Book provides the details for the right control.

The hidden Calculations worksheet is used to store the active settings for customizable parameters such as company name or the directory for temporary files, and customizable thresholds used in risk and maturity scoring, to calculate and store maturity goals (priority, level and score) based on inherent risk, and to determine the colors of aggregate values on the Dashboard. The hidden Responses worksheet contains both the logic and the content for displaying the appropriate narrative on the Dashboard pertaining to the inherent risk score.

Data flows upward. When the user inputs data into the Inherent Risk Profile, calculations are made in the Calculations worksheet, textual responses are chosen in the Responses worksheet, and aggregated risk scores and associated text are displayed on the Dashboard. When the user inputs data into the control maturity questionnaires or the Control Book, maturity scores are calculated in the hidden Maturity Results and Maturity Report worksheets. When the user customizes a parameter or resets its value to its factory default in the User Profile (worksheet "Profile"), the value is stored in the Calculations worksheet for use in various formulae throughout the KMS.

The Maturity Results worksheet is then used by the hidden Distributions, Maturity Totals, and Top Ten worksheets to aggregate scores for the Dashboard. Maturity scores for predefined levels are aggregated into pivot tables in the Distributions worksheet. Actual control scores based on user input are aggregated into pivot tables in the Maturity Totals worksheet. And actual control scores are compared to expected scores and controls are sorted to show those controls with the largest shortfall, using pivot tables in the Top Ten worksheet. For each functional area, lifecycle phase, and control category, Aggregated Maturity is compared to Expected Maturity, and gaps are listed along with the associated control shortfalls, in the Notable Gaps worksheet. The Notable Gaps Detail and Optional Gaps worksheets are used in support of the Notable Gaps worksheet, and are hidden from view.

The "IHP Report" worksheet prepares an Executive Summary of inherent risk and corresponding maturity goals, and an Inherent Risk Profile for use by the Inherent_Risk_Report macro. Thus, if the user clicks on the "Risk Report" button on the Dashboard, the KMS executes the Inherent_Risk_Report macro which reports summary data from "IHP Report" and a list of risk factors and levels from the "Inherent Risk Profile" worksheet. The "Maturity Report" worksheet prepares a full listing of risk factors and controls for use by the Maturity_Report macro. If the user clicks on the "Maturity Report" button on the dashboard, the KMS executes the Maturity_Report macro which reports summary risk and maturity data from the Dashboard, a list of risk factors and levels from the "Inherent Risk Profile" worksheet, and a list of controls and levels from the "Maturity Report" worksheet. When the KMS generates a report, it creates an Adobe Acrobat report file within the same directory as the KMS workbook and makes this file available for viewing by the user.

The KMS includes several VBA procedures to handle complex dependencies between spreadsheets, to process hyperlinks and ActiveX controls, to refresh pivot tables, and to calculate notable gaps and associated control shortfalls. These procedures are triggered by Excel events as outlined in Table 10 Event Triggered VBA Procedures.

TABLE 10

Event Triggered VBA Procedures

| Workbook or sheet | Excel Event | Action |
|---|---|---|
| WorkBook | Open | Initialize global variable PrevPriorityGoal. This variable is used to track changes in the Priority Goal when changes are made to the Inherent Risk Profile. |
| | SheetActivate | If the sheet is a Control Maturity questionnaire and a Control Name cell with a hyperlink is active, then call Initialize_Control_Book |
| "Inherent Risk Profile" | Change | If the Risk Level is changed then check if Priority Goal has changed and reset filters. Procedure Reset_Filters_For_Priority resets the Priority filter on each Control Maturity worksheet. Note that Control Maturity worksheets are referred to in the VBA comments as "summary sheets" (in contrast to the Control Book which provides the full detail for a control). |
| | SelectionChange | Link Comments box to cell AB of selected row |
| "Governance", "Endpoints", "Network", "Access", "Data", "Dependencies", "Awareness" | Change | If Control Level is changed, then call Set_Control_Variables to set Scope, Policy, Responsibility, and Oversight to N/A or to their defaults as appropriate |
| | SelectionChange | If a Control Name cell with a hyperlink is selected, then call Initialize_Control_Book |
| "Dashboard" | Activate | Refresh all pivot tables |
| | Click (Inherent Risk Report Button) | Call Inherent_Risk_Report (prepare report, print to pdfs then combine and display) |
| | Click (Maturity Report Button) | Call Maturity_Report (prepare report, print to pdfs then combine and display) |
| "Control Book" | Click (ArrowLeft5) | Call Scroll_Backward (choose previous control and call Initialize_Control_Book) |
| | Click (ArrowRight3) | Call Scroll_Forward (choose next control and call Initialize_Control_Book) |
| | Change (cell Compensating Score or textboxes Additional Information or Compensating Description) | Update Control Maturity worksheet |
| | Click (radio buttons OptionLevelAdvanced, OptionLevelIntermediate, OptionLevelBasic) | Call Clear_Compensating_Control_Fields (zero out the score and null out the description) then update Control Maturity worksheet |
| | Click (radio buttons OptionLevelCompensating, OptionScopeAll, OptionScopeMost, OptionScopeSome, OptionDocumentedNA, OptionDocumentedNo, OptionDocumentedYes, OptionAssignedNA, OptionAssignedNo, OptionAssignedYes, OptionMonitoredNA, OptionMonitoredNo, OptionMonitoredYes) | Update Control Maturity worksheet |
| "Notable Gaps" | Click (Refresh button) | Call List_Notable_Gaps( ) |

Inherent Risk Profile

The Inherent Risk Profile worksheet consists of one row for each risk factor, grouped by risk categories designated by a black line. To assist the user visually, alternate rows within each risk category are colored light green. For each risk factor the user chooses the most appropriate Risk Level from the pull-down menu, which is created in Excel using the Data Validation feature.

If the assessor is completing the questionnaire during an interview with the Organization, then she can add any supporting detail in the Comments box for that risk factor. The supporting detail can be useful in helping the assessor understand specifics about the Organization. These details can also contribute to the narrative in the final Assessment Report. The Comments box is positioned below the last question and can be positioned to remain on the screen using Excel's "Split" screen feature within the "View" menu. The Comments box is an ActiveX textbox which is linked to a hidden cell in column AB in the appropriate row using the Worksheet_SelectionChange event.

Based on the selection, the KMS assigns a Risk Rating for the risk factor and then calculates a Risk Score as described in the section on Inherent Risk. The Risk Rating is chosen from the lookup table in hidden columns "1—Minimal", "2—Moderate", "3—Significant" and stored in hidden column "Rating". The Risk Score is calculated by multiplying this Rating by the value in hidden column "Weight" and is stored in hidden column "Weight*Rating". The Maximum Risk Score is calculated by multiplying the Risk Rating in hidden column "3—Significant" by the value in hidden column "Weight" and is stored in hidden column "Weight*Max Rating".

The inherent risk questionnaire is divided into risk categories. For each risk category the KMS adds up the Risk Scores and the Maximum Risk Scores and stores them in hidden columns "Weight*Rating" and "Weight*Max Rating" respectively, in the row following the last factor in the category. The KMS calculates the Category Risk Score for each category as described in the section on Inherent Risk. This calculation is performed in the Dashboard within the Inherent Risk Profile section, in cells that are formatted as Numbers with format ";;;" to hide the scores.

To determine which level the category score falls into, the KMS compares the category score against the scores for all minimal, all moderate and all significant, and finds the closest match as described in the section Completing the Inherent Risk Questionnaire. This comparison is performed within the Calculations worksheet in the section titled "Dashboard: Determining Best Profile Match for Average Risk". It uses the COUNTIF, LARGE and SMALL. To determine the color of each of the bars in the Inherent Risk Profile, the KMS follows the procedure outlined in the section Completing the Inherent Risk Questionnaire. To set the color the KMS uses the procedure for "Conditional Formatting of Excel Charts" described by Jon Peltier.

The KMS calculates the Total Inherent Risk Score as described in the section on The Technology Data Model→Inherent Risk. It does this calculation on the Dashboard in the Executive Summary section, in a cell which hides its value via Number format ";;;".

Mapping Inherent Risk to Control Maturity

As described in Mapping Inherent Risk to Control Maturity, the KMS establishes three goals for control maturity based on the Total Inherent Risk Score: an aspirational Maturity Score called the Total Maturity Goal, a Priority, and a Control Level. The Total Maturity Goal is shown on the Dashboard in the Executive Summary section under "Maturity Goal". The goals for Priority and Control Level are explained in the text taken from the cell labeled "Goal" in the hidden Responses worksheet. This text is displayed on the Dashboard alongside the black and white bar chart showing the maximum possible maturity scores for each of the nine control levels (Basic, Intermediate and Advanced for each priority P1, P2, P3).

The procedure for establishing these goals involves the use of a mapping table (Table 1 Mapping Inherent Risk to Maturity) that maps nine levels of inherent risk to nine levels of control maturity. The mapping is carried out in the Calculations worksheet in the section titled "Dashboard: Mapping Inherent Risk to Maturity" and stored in a block of cells title "Mapping Table". The Priority and Level goals are chosen by finding the closest match using the COUNTIF, LARGE and SMALL functions. The Total Maturity Goal and corresponding Priority and Level are stored in a block of cells in the Calculations worksheet titled "Maturity Goals". These values are copied to the section "Dashboard: Executive Summary" within the Calculations worksheet which is used to populate the Executive Summary section of the Dashboard.

To facilitate rapid "what if" analysis, the Total Inherent Risk Score calculated from the Inherent Risk Profile can be overridden manually by entering a value into the cell below the Maturity Goal in the Executive Summary section of the Dashboard. If this cell contains a non-zero value, The KMS recalculates the Total Maturity Goal and corresponding Priority and Level and stores these below the real values in the Calculations worksheet in the block of cells titled "Maturity Goals". The override values are copied to the section "Dashboard: Executive Summary" within the Calculations worksheet and are used to populate the Executive Summary section of the Dashboard instead of the real values.

The Control Maturity Worksheets

The Control Maturity questionnaires are created using Excel worksheets which consist of information fields for the Primary Phase, Control Name and Control Description, and input fields for Control Level, Scope of Implementation, Policy Documented, Responsibility Defined, and Oversight Documented. All other fields relevant to the control are hidden. The column headings for information fields have a blue background. The column headings for input fields have a green background.

If the user chooses "Compensating" for Control Level, she can enter a Compensating Description and Compensating Score in the Control Book "page" for this control, brought up by clicking the hyperlinked Control Name. The Control Book can also be used to enter Additional Information for the control, and to review the other informational fields for the control, including Functional Area, Sub-Function, Category, Priority, the relevant NIST SP 800-53 Rev 4 control, the relevant CSC 6.1 control, Other References, the TCO and ROI for the control, Implementation Tips, recommended Top Solutions, and Other Solutions.

Note that each Control Maturity worksheet consists of two sets of columns, each marked by a table. The first set of columns contains the informational, input, calculated and derived fields for the control, marked by a table with the same name as the worksheet e.g. for the worksheet "Governance", the table is called "Governance". The second set of columns is used to determine whether to show or hide a row and what colors should be used for the input fields. This set of columns is marked by a table with the name "<Worksheet Name>Colors" e.g. for the Governance worksheet the table is named "GovernanceColors".

When a Control Maturity worksheet is opened, the filter on the column "Matches Priority Goal" is applied so that only rows with a value of 1 are shown i.e. only controls whose Priority is less than or equal to the Priority Goal are shown, as described in the section Completing the Control Maturity Questionnaires and FIG. 8. As the input fields for the control are filled out, the KMS calculates the Score for the control if the user has chosen one of the predefined levels (Basic, Intermediate, Advanced) for the control, or the KMS calculates the Override Score for the control if the user has chosen "Compensating" as the level.

The formulae for scoring are outlined in the section Completing the Control Maturity Questionnaires. The KMS uses the LOOKUP functions to consult the relevant tables within the Calculations worksheet that translate values from user input fields into values that can be used by the formulae. These are all single stage lookups with the exception of Control Level which requires a two-stage lookup: firstly, looking up the Calculations worksheet to translate "Basic" to "L4" etc. and, secondly, looking up the Base Control Maturity worksheet to translate "L4" to 0.5 etc.

As the input fields for the control are filled out, the KMS also color codes these cells using Excel Conditional Formatting rules which apply the values in the "<Worksheet Name>Colors" table to determine whether the cells should be left uncolored, or colored orange, or red, as described in the section Completing the Control Maturity Questionnaires and FIGS. 11 and 12.

The Control Book

The Control Book worksheet can be opened either directly from the Excel worksheet tab, or by clicking on the hyperlink attached to the Control Name in the Control Maturity worksheets. The hyperlink positions the cursor on the Control Name cell in the Control Book. The values displayed in the Control Book are determined by procedure Initialize_Control_Book. This procedure is called when a SelectionChange event occurs in a Control Maturity worksheet and the active cell is a Control Name with a hyperlink. It is also called when SheetActivate occurs for a Control Maturity worksheet and the active cell is a Control Name with a hyperlink. Calling the Initialize_Control_Book procedure on a SheetActivate event caters for the circumstance where the user is on, say, Governance, clicks on a hyperlink for, say, Risk Assessment Frequency, then opens the Endpoints worksheet and clicks on say, Whitelisting, then returns to Governance and clicks once again on Risk Assessment Frequency. If the Initialize_Control_Book procedure were only triggered by a SelectionChange event then it would not be called in this instance, since the user has not changed the selection in the Governance worksheet, thus the user would still see the Whitelisting control in the Control Book. Calling the Initialize_Control_Book on the SheetActivate event ensures that the Control Book is populated with the fields from control Risk Assessment Frequency.

Once in the "Control Book" the user can return to the Control Maturity worksheet by clicking on the hyperlinked Control Name in the Control Book. Alternatively, the user can scroll forward to the next control in the "Control Book" or scroll backward to the previous control in the "Control Book" by clicking on the ArrowRight or ArrowLeft objects in the Control Book. These procedures trigger VBA macros which reset the active control as described below and then call Initialize_Control_Book to populate the Control Book with the appropriate values for the next or previous control.

If the user clicks on the right arrow, then VBA retrieves the values of the named variables Sheet_Name and Row_Num and then increments Row_Num by 1. If the Row_Num has gone past the last row for the table, then VBA chooses the next worksheet listed in Active Control and sets the Row_Num to 1 for the first row. If the Sheet_Name is "Awareness" i.e. the last one listed in Active Control, then VBA chooses worksheet "Governance" i.e. the first worksheet.

If the user clicks on the left arrow, then VBA retrieves the values of the named variables Sheet_Name and Row_Num and then decrements Row_Num by 1. If the Row_Num has gone past the first row for the table then VBA chooses the previous worksheet listed in Active Control and sets the Row_Num to the last row of the table for that worksheet. If the Sheet_Name is "Governance" i.e. the first one listed in Active Control, then VBA chooses worksheet "Awareness" i.e. the last worksheet.

Note that by navigating the Control Book in this way, the user is able to view and/or update ALL the controls in the KMS, not just those controls that are relevant to the Organization's inherent risk i.e. those that fall within its Priority Goal. The aggregate maturity values shown in the Dashboard and Notable Gaps worksheets will not include controls that are beyond the Organization's Priority Goal—these controls are ignored in the calculations.

Procedure Initialize_Control_Book populates the Control Book worksheet with data pertaining to the control in the Control Maturity worksheet that is currently active. To identify the control, it calls Update_Control_Context to update the Active Control worksheet with the sheet name, row number and Control Name of the selected control. The Control Book worksheet retrieves these identifiers into named variables Sheet_Name, Row_Num and Control_Name. These named variables are used in cell formulae to look up the values for the informational fields for that control from the appropriate Control Maturity worksheet and associated base worksheet and populate all the informational cells in the Control Book as well as the hidden "feeder" cells used to "feed" the radio buttons, text boxes and input fields. The formulae in the Control Book use dynamic ranges built using named variables and structured table references.

As an example, the feeder cell for the Description for a Control Level of "Basic" is populated using the following formula:

=INDEX(INDIRECT("Base"&Sheet_Name&"[L4-Basic]"),MATCH(Control_Name,INDIRECT("Base"&Sheet_Name&"[Control_Name]"),0))&""

Read the formula from the inside out. Assume the active control is "Acceptable Use Policy" within the Governance worksheet. Note that each Base Control Maturity worksheet consists of a table with the name "Base<Sheet_Name>". Thus "BaseGovernance[Control_Name]" is a text string containing a structured reference to an array of control names in the "BaseGovernance" table, which resides in the "Base Governance" worksheet. The function INDIRECT converts this text string to an Excel reference to the range of cells holding the control names. Then the function MATCH looks up this range of cells to find the control with the name "Control_Name" (in this case "Acceptable Use Policy") and returns the row number in the table for this control.

"BaseGovernance[L4—Basic]" is a text string containing a structured reference to an array of descriptions for a Control Level of "Basic" in the BaseGovernance table. The function INDIRECT converts this text string to an Excel reference to the range of cells holding the descriptions. The INDEX function uses the row number returned from the MATCH function to look up the range of cells holding the descriptions and returns the Description for a Control Level of Basic for control "Acceptable Use Policy", in this case "Ownership of Organization's IT resources is defined, notice of monitoring and lack of privacy is issued". To ensure that a value of "0" is not shown in the ease of a null string, the result is concatenated with " " using the operand "&".

To populate the radio buttons, procedure Update_Option_Buttons is called, which in turn calls procedures Update_Level_Button, Update_Scope_Button, Update_Policy_Button, Update_Responsibility_Button, and Update_Oversight_Button. These procedures retrieve the value for the appropriate button from the appropriate Control Maturity worksheet and use this value to populate the feeder cell for the button i.e. in ActiveX terms, the "LinkedCell". Feeder cells for radio buttons are located one cell to the right of the radio button and are formatted as numbers with format ";;;" so that their values are not shown.

To populate the text boxes procedure Update_Text_Boxes is called. The feeder cells for the text boxes are populated directly by the Excel formulae which access the appropriate fields in the Base Control Maturity Worksheet for the active control. Procedure Update_Text_Boxes uses the value in the feeder cell for each text box to update the text in the text box using the OLEObjects class. Feeder cells for text boxes are hidden from view: they are located in the cell underneath the text box and formatted as "General" format cells. To populate the input field Compensating Score procedure Update_Other_Cells is called. The feeder cell for Compensating Score is populated directly by an Excel formula which accesses the appropriate field in the Control Worksheet for the active control, Procedure Update_Other_Cells uses the value in the feeder cell for Compensating Score to update the value in the Compensating Score cell. The feeder cell for Compensating Score is located one cell to the right of the Compensating Score cell and is formatted as a number with format ";;;" so that its value is not shown.

Finally, to populate the comments for the Level Description, CSC 6.1, NIST 800-53 Rev 4 and TCO cells, procedure Update_Comments is called. The feeder cells for the Level Description and TCO comments are populated directly by the Excel formulae which access the appropriate fields in the Base Control Worksheet for the active control. To retrieve the comments from the Base Control Worksheets for the three Level Descriptions—Basic, intermediate, and Advanced—the KMS uses the function GetComment( ). The feeder cell for the CSC 6.1 comment is populated directly by the Excel formula which accesses the appropriate fields in the CSC 6.1 worksheet for the active control.

Procedure Update_Comments uses the values in the feeder cells to add the comments for the Level Description, CSC 6.1 and TCO cells. The feeder cells for the Level Description comments are held within named variables Level_Description_Basic_Cell_Cell_Source, Level_Description_Intermediate_Cell_Cell_Source, and Level_Description_Advanced_Cell_Cell_Source, whose values are set in hidden rows below the visible fields of the Control Book and which point to hidden cells located in hidden columns to the right of the Level Description fields. The feeder cells for the CSC 6.1 and TCO comments are held within named variables CSC_61_Cell_Source and TCO_Cell_Source, whose values are set in hidden rows below the visible fields of the Control Book and which point to hidden cells located in hidden columns to the right of the CSC 6.1 and TCO fields.

Due to the complexity of parsing the NIST 800-53 Rev 4 worksheet, procedure Update_Comments calls procedure NIST_Multiline_Comment to retrieve the text from worksheet NIST 800-53 Rev 4 for the control and populate the feeder cell for the comment for NIST 800-53 Rev 4. Procedure Update_Comments then uses the value in the feeder cells to add the comment for the NIST 800-53 Rev 4 cell. The feeder cell for the NIST 800-53 Rev 4 comment is held within named variable NIST_Cell_Source, whose value is set in a hidden row below the visible fields of the Control Book, and which points to a hidden cell located in a hidden column to the right of the NIST 800-53 Rev field.

To avoid hard coding cell references in the VBA procedures for the Control Book and thereby allow some flexibility to redesign the layout of the Control Book, these procedures determine cell references by looking up named variables. All feeder cell references are stored in named variables which are set in hidden rows below the visible fields in the Control Book.

Aggregating Maturity Scores for the Dashboard

Behind the scenes, as the user is filling out the Control Maturity questionnaires, the KMS works in the background to aggregate maturity scores and display them on the Dashboard. All aggregations for the Dashboard, with the exception of the report, derive from the Maturity Results worksheet. This hidden worksheet is simply the union of the seven Control Maturity worksheets with the addition of a few fields as described in Table 11 Fields Added to Maturity Results Worksheet. The KMS populates this worksheet as the user fills out the Control Maturity worksheets.

TABLE 11

Fields Added to Maturity Results Worksheet

| Field | Description | Values |
| --- | --- | --- |
| Score as Percent | The Score as a fraction of the Maximum Score i.e. Score/Max Score | From 0.00 to 1.00 |
| Shortfall | The gap between the Score and the Maximum Score i.e. Max Score − Score | From 0.00 to 1.00 |
| Shortfall as Percent | The gap as a fraction of the Maximum Score i.e. (Max Score − Score)/Max Score | From 0.00 to 1.00 |
| Include Control | If Priority <= Priority Goal, then "Y", else "N" | "Y" or "N" |
| L4Max | Max Score * Degree for level "Basic" | From 0.0001 to 1.0000 |
| L5Max | Max Score * Degree for level "Intermediate" | From 0.0001 to 1.0000 |
| L6Max | Max Score * Degree for level "Advanced" | From 0.0001 to 1.0000 |
| Hyperlink | Link to the Control Level for this control in the Control Worksheet | e.g. Governance!E2 |

The first set of aggregated results is calculated in the Maturity Totals worksheet. This worksheet has five pivot tables based on the Maturity Results worksheet. The first calculates the sum of Max Score by Functional Area and Phase. The second calculates the sum of Expected Score by Functional Area and Phase. The third calculates the sum of Score by Functional Area and Phase. The fourth calculates the sum of Max Score by Control Category. The fifth calculates the sum of Score and the sum of Expected Score by Control Category. For each pivot table a filter is applied so that only controls for which Include Control is "Y" are included.

The GETPIVOTDATA function is used to retrieve the values from the pivot tables into temporary tables so that normalized scores can be calculated. A normalized score is simply the Score divided by the Max Score and results in an index between 0.00 and 1.00. If the user takes advantage of the Slicers on the dashboard, some of the GETPIVOTDATA calls may return an error e.g. if the user clicks on the Slicer for Function "Prevent" then there will be no data in the pivot tables in Maturity Totals for the other functions, so GETPIVOTDATA calls for these other functions will return a #REF! error. The KMS checks for cells where GETPIVOTDATA returns an error and returns a blank for the normalized score in this case. The normalized scores are used to populate the Maturity Level grid on the dashboard, the tables in the Calculations worksheet used to populate the Bar Charts on the dashboard for maturity by Function, Lifecycle, and Category, and the cell in the Calculations worksheet used for Summarizing the Overall Maturity on the dashboard.

The second set of aggregated results is calculated in the Top Ten worksheet. This worksheet has four pivot tables based on the Maturity Results worksheet. The first generates data for the Dashboard. It shows the top sub-functions in descending order of Shortfall. Right click on the filter icon to see the Top Ten value filter. Right click on one of the values for "Sum of Shortfall" to see the Sort Options. The second generates data for the Dashboard and the Notable Gaps worksheet when the parameter Remediation Sequence is set to "Efficacy". It shows the top controls in descending order of Shortfall. The third pivot table lists the top controls in ascending order of priority and then descending order of shortfall, and is used to generate data for the Notable Gaps worksheet when the parameter Remediation Sequence is set to "Custom". The fourth and final pivot table lists the top controls in descending order of control score, and can be used by the assessor when she wishes to document which controls the organization has put into place that are highly effective. For each pivot table a filter is applied so that only controls for which Include Control is "Y" are included.

The organization need only achieve an Aggregated Maturity score that reaches the Expected Maturity score for each functional area, lifecycle phase, and control category. It should have some flexibility about how to reach this threshold e.g. by implementing some controls above target maturity and some below. It is too rigid to expect every individual Control Score to reach or exceed the Expected Score.

Before presenting the top sub-functions and control shortfalls on the Dashboard the KMS accounts for cases where there are less than ten rows, by blanking out the values for non-existent rows, and it filters out any rows for which the Shortfall rounded to two decimal places is 0.00. For the top ten controls it retrieves the Hyperlink for the control pointing to the Control Level field in the summary worksheet for the functional area assigned to the control. The KMS then displays the top ten sub-functions and the top ten controls with hyperlinks on the dashboard.

The third set of aggregated values is calculated in the Distributions worksheet. This worksheet uses a pivot table which calculates the maximum possible maturity score for each combination of Priority and Control Level. It then creates a table of normalized values by dividing each score by the maximum total score. This table has nine values corresponding to the three levels of Priority and the three Control Levels. The creation of the table is described in the section Mapping Inherent Risk to Control Maturity. It is shown in the second column of Table 1 Mapping Inherent Risk to Maturity. The table is copied to the Calculations worksheet where it is used to determine the appropriate maturity goals for a given inherent risk. The Distributions worksheet also contains a pivot table to show the distribution of control across control categories. This is useful for the developer to ensure a proper balance.

The final set of aggregated values is calculated in the Notable Gaps worksheet. The worksheet has four columns. The first column is a deduplicated list of all the controls needing improvement. The second, third and fourth enumerate the gaps in the functional areas, lifecycle phases, and control categories. A gap exists when the Aggregated Maturity falls below the Expected Maturity. For each gap, the KMS lists the name of the group, the Aggregated Maturity, the Expected Maturity, the Maximum Maturity, the size of the gap, and the controls with the largest shortfall which, when remediated, will bring the Aggregated Maturity up to the Expected Maturity.

When the user clicks on the "Refresh" button in the Notable Gaps worksheet the KMS executes procedure List_Notable_Gaps. This procedures cycles through each functional area, lifecycle phase, and control category, automatically applying the slicers on the Dashboard to select each area, phase or category one by one. For each group, it retrieves the Aggregated Maturity, Expected Maturity and Maximum Maturity from the pivot tables in the Maturity Totals worksheet. It then uses the pivot tables in the Top Ten worksheet to cycle through the top control shortfalls until the gap has been remediated; the control list is sorted in descending order of Shortfall if the parameter Remedtiation Sequence is set to Efficacy, or it is sorted in ascending order of priority then descending order of Shortfall if the parameter is set to Custom. Since a control can appear in multiple groups, procedure List_Notable_Gaps concludes by creating a deduplicated list of the controls, which, when remediated, will enable the Organization to reach the Expected Maturity for all groups, as well as to reach the Total Maturity Goal for the entire assessment.

Reporting Procedures

The user can generate Adobe Acrobat report files from the dashboard by clicking on the "Inherent Risk Report" and "Maturity Report" buttons. The Inherent Risk Report shows the Inherent Risk Profile from the Dashboard and the Risk Level and Notes for each risk factor in the Inherent Risk worksheet. The "Maturity Report" shows the Risk Level and Notes for each risk factor in the Inherent Risk worksheet; the Control_Name and Description, Level and Description, Additional Information and Score/Max Score for each control in the control maturity worksheets; and a complete snapshot of the Dashboard showing the Inherent Risk Profile, the Cybersecurity Maturity Levels and the Top Gaps. After generating a report file, which is stored in the directory designated by the user for storing temporary files, the user is given the option to view the report in a separate window.

When the user clicks the "Inherent Risk Report" button, procedure "Inherent_Risk_Report" executes and retrieves data from the "IHP Report" and "Inherent Risk Profile" worksheets. The "IHP Report" worksheet is similar in structure and contents to the Dashboard, but shows only the Inherent Risk Profile and the maturity goals, not the maturity results. When the user clicks the "Maturity Report" button, procedure "Maturity_Report" executes and retrieves data from the Dashboard, "Inherent Risk Profile" and "Maturity Report" worksheets.

The "Maturity Report" worksheet is similar in structure and contents to the Maturity Results worksheet, but has three minor differences, designed to facilitate the report. The first is the addition of the Level Description field, which is populated from either the Compensating Control field or the appropriate Level Description field in the base worksheet, depending on how the Control Level is set. The second is the merging of the Override Score field into the Score field when the user has input a Compensating Score. And the third is the addition of a field which combines the Score and the Max Score into one text field with format "Score/Max Score".

Procedures "Inherent_Risk_Report" and "Maturity_Report" use worksheet method "ExportAsFixedFonnat" to write the data to pdf files. They create an array of filenames, one for each worksheet being reported on: the Dashboard, the Inherent Risk Profile, and (in the case of the "Maturity Report") the seven. Control Worksheets. They use the worksheet name and append a timestamp to create a unique name for each pdf file. They use the PageSetup method to format the layout, header and footer of each report file. And they use the Hidden method to hide unwanted columns and the AutoFilter method to hide unwanted rows.

These procedures then call procedure Combine_Report_Files_and_Display. This procedure calls the PDFCreatorCombine procedure to combine the files in the array into a single file. PDFCreatorCombine uses the FileSystemObject from the Microsoft Scripting Library to check if the individual pdf files created above actually exist and creates an array of validated files for use by the PDFCreator object. The PDFCreator object is used to add all files to the queue as separate jobs, merge these jobs into one, establish a print profile for the job, and actually convert the job into the combined file. It then uses the MsgBox dialog to provide the user with an opportunity to view the file using the Shell command "cmd /c CombinedFilename".

The User Profile

The "Profile" worksheet allows the user to customize certain parameters used by the KMS in Excel formulae. Inputs are labeled in green. All parameters are copied to the Calculations worksheets for use by the KMS Excel formulae. The Calculations worksheet also stores factory defaults for each parameter. Thus for each parameter or set of parameters in the "Profile" worksheet there is a "Set Default(s)" button. When clicked, this button causes a VBA procedure to execute which resets the parameter to its factory default. The procedure uses a named range prefixed "Default_" for the cell in the Calculations worksheet containing the default value and a named range prefixed "Profile_" for the cell in the "Profile" worksheet containing the current parameter setting.

Error Handling and Logging

The KMS employs error handling within both the Excel worksheets and the VBA procedures. Within the worksheets it makes use of the IFERROR and ISNA functions to cover up unsightly #REF! and #N/A errors. Within VBA, the KMS employs the following approach outlined in Excel Macro Mastery:
1. Error Trapping in VBA is set to "Break on Unhandled Errors" (Tools→Options→General).
2. All routines are designed to handle errors so that the user never ends up in Visual Basic.
3. All routines use "On Error GoTo ErrorHandler" to trap and log unanticipated errors for tracking and debugging.
4. All routines use "On Error Resume Next" to trap anticipated errors and MAY use the ErrorHandler routines to log the error, if this will be useful for tracking and future debugging. The aim is to respond to the anticipated error in the least disruptive manner and then reset the routine back to "On Error GoTo ErrorHandler".
5. When a routine includes branches to the ErrorHandler, an Exit Sub or Exit Function precedes the ErrorHandler.

The ErrorHandler simply calls the Error_Handle procedure and passes it four parameters: the name of the procedure or function, usually set at the beginning of the procedure or function, Err.Number, Err.Description, and a variable also usually set at the beginning of the procedure or function which contains any contextual information that may be useful for debugging, such as a short description of the functionality, a cell address, or a column name. Err.Number is the number of the error. Err.Description is the text of the error.

The Error_Handle procedure calls procedure LogFile_WriteError. The Error_Handle procedure also has commented code that can be uncommented during testing which issues a message using the MsgBox function to the user based on the four parameters described above. Procedure LogFile_WriteError is a generic procedure that uses the File System Object to write error messages to a logfile. The logfile is expected to exist or is created in the directory whose name is stored in named variable "Directory_for_Temporary_Files", which is set in the User Defined Parameters section of the hidden Calculations worksheet according to the customizable parameter "Directory for Temporary Files" in the User Profile. The code for the Error Handle and Logfile_WriteError procedures is taken from Better Solutions Ltd. If errors occur when using the KMS, it is recommended that the logfile be sent to the developer to assist in problem isolation.

Backup and Restore

The KMS includes VBA procedures which can be called to backup and restore the data input into the KMS or to reset the factory settings for all user input. The backup and restore procedures create a workbook with the same filename as the main KMS workbook but appended with the suffix "_Save_Settings.xlsx" and then create a worksheet for each worksheet the user wishes to backup or to restore. Subsequent backups reuse the same workbook and overwrite the worksheets.

Procedure "Save_Settings_User_Profile" backs up the value for each user-defined parameter in the "Profile" worksheet. Procedure "Restore_Settings_User_Profile" restores the settings for these parameters from the "_SaveSettings.xlsx" workbook to the "Profile" worksheet in the KMS workbook when it is called with parameter "Restore". It restores the factory defaults for the parameters in the "Profile" worksheets when it is called with parameter "Default".

Procedure "Save_Settings_IHP" backs up the data input into the "Inherent Risk Profile" worksheet. Procedure "Restore_Settings_IHP" restores the data from the "_Save_Settings.xlsx" workbook to the "Inherent Risk Profile" worksheet in the KMS workbook when it is called with parameter "Restore". It restores the factory defaults in the "Inherent Risk Profile" worksheet in the KMS workbook when it is called with parameter "Default".

Procedure "Save_Settings_Maturity" backs up the data input into the control maturity worksheets. Procedure "Restore_Settings_Maturity" restores the data from the "_Save_Settings.xlsx" workbook to the control maturity worksheets in the KMS workbook. Procedure "Set_Maturity_Defaults" restores the factory defaults in the control maturity worksheets in the KMS workbook.

You can run the backup and restore procedures individually by bringing up a list of Macros from the Developer tab in Excel, choosing the appropriate procedure, and then clicking "Run". This works for the above procedures, except "Restore_Settings_User_Profile" and "Restore_Settings_IHP", which require a parameter and which you will need to execute directly by going to Visual Basic from the Developer tab and typing in "Restore_Settings_User_Profile ("Default"), "Restore_Settings_User_Profile("Restore"), "Restore_Settings_IHP("Default")", or "Restore_Settings_IHP("Restore")" from the Immediate Window (Ctrl+G within the Visual Studio).

If you wish to backup all user settings you can execute procedure "Save_Settings_All", which executes all three routines, "Save_Settings_User_Profile", "Save_Settings_IHP", and "Save_Settings_Maturity". If you wish to restore all factory defaults you can execute "Restore_Settings_All("Default")" which executes "Restore_Settings_User_Profile("Default"), "Restore_Settings_IHP("Default"), and "Set_Maturity_Defaults". If you wish to restore all user settings from backup you can run "Restore_Settings_All("Restore")" which executes "Restore_Settings_User_Profile("Restore"), "Restore_Settings_IHP("Restore"), and "Restore_Settings_Maturity".

Hidden and Protected Areas

The KMS includes helper cells and worksheets that are required for processing, but which are hidden from the user. These are hidden from the user by executing the ".Hidden" and ".Visible" methods respectively within VBA using the "Hide_Columns" and "Hide_Worksheets" procedures. The "Hide_Columns" procedure loops through all visible worksheets and hides any columns containing helper cells. It also hides the column headings, the grid lines, and the formula bar for each visible worksheet. The "Hide_Worksheets" procedure loops through all worksheets in the workbook and calls the "Check_Visible" function to check if the worksheet should be visible or not.

Hidden cells cannot be viewed by the user with the "Unhide" feature of Excel without a password, because the relevant worksheets are password protected. Similarly, hidden worksheets are not visible to the user without a password since the workbook structure is password-protected. And similarly, the Visual Basic macros cannot be viewed by the user without a password because these are protected via the Tools→VBAProject Properties→Protection tab in Visual Studio. Finally, the workbook itself cannot be opened by the user without a password because the workbook itself is password-protected.

There is one password in the KMS used to protect all worksheets with hidden cells. There is a separate password in the KMS used to protect the workbook structure, the macros, and the workbook itself. To share these passwords, they should be communicated "out-of-band" i.e., in a separate channel than that used to send the KMS workbook.

The KMS can be described with reference to the following claims to various aspects of the disclosure. The claims set forth several unique and compelling aspects of the KMS, but are not meant to be comprehensive of each feature of the KMS.

What is claimed is:

1. A method for identifying gaps in an organization's cyber defenses, and identifying and prioritizing remediations that are designed to eliminate those gaps, comprising:
   a. using a multiple choice questionnaire, wherein each question corresponds to a risk factor and an inherent risk score is calculated for the question based on a weighting factor associated with the question and a risk rating associated with the answer, and wherein said inherent risk scores are used to calculate a normalized total inherent risk score for the organization;
   b. predefining, prioritizing, weighting, and scoring a universe of security controls that can be implemented at different levels of functionality represented by declarative statements, preassigning each security control to distinct functional, lifecycle, and control groups, selecting from this universe a set of security controls and corresponding levels that the organization is expected to implement to achieve reasonable and effective security based on its normalized total inherent risk, calculating an expected maturity score for said selected security controls, and determining an actual maturity score for said selected security controls based on a series of multiple choice questionnaires;
   c. aggregating and comparing said actual and expected maturity scores by said functional, lifecycle, and control groups, to identify and quantify gaps in the actual aggregated maturity scores of said groups which present unreasonable residual risk;
   d. and recommending and prioritizing improvements to the security controls in said groups whose actual maturity score falls short of the expected maturity score, to raise the actual aggregated maturity score of said groups with said identified gaps to the expected level, thereby eliminating unreasonable residual risk;

wherein the steps above are implemented using a computing device;

in this manner the organization can identify a sequenced set of concrete steps it can take to achieve reasonable and effective security.

2. The method of claim 1, wherein step a) comprises:
   a. using expert judgment and open source threat intelligence, predefining a list of generic risk factors and grouping these into risk categories for "Assets", "Data", "Media", "Staff", "$3^{rd}$ Parties", "Facilities", "IT infrastructure", and "Applications";
   b. using expert judgement and open source threat intelligence, pre-assigning a weighting factor $w_i$ for each risk factor i, which represents an estimate of the size of risk factor i relative to other factors in the same category;
   c. using expert judgement, pre-assigning a set of declarative statements for each of said risk factors, which describe levels of minimal, moderate, and significant risk;
   d. using expert judgement, pre-assigning a numerical value between 0 and 1 for each declarative statement, which represents an estimated risk rating $r_{ij}$ for risk factor i and level j;
   e. prompting the user with the choice of said declarative statements for each of said risk factors;
   f. receiving the chosen response from the user and multiplying the risk rating $r_{ij}$ for the chosen level j by the weighting factor pre-assigned for this risk factor $w_i$, to establish an inherent risk score $R_i$ for factor i, as in the formula $R_i = w_i r_{ij}$;
   g. adding up the inherent risk scores for each risk category C and dividing by the maximum total inherent risk score for each category C to generate a normalized category inherent risk score, as in the formula $R_C = \sum_{i=1}^{n} w_i r_{ij} / \sum_{i=1}^{n} w_i \max(r_i)$, where $\max(r_i) = r_{iSignificant}$ and n is the number of risk factors in risk category C;
   h. calculating a threat score T using the risk scores for the "Assets", "Data", and "Media" categories, and the formula $$T = \frac{R_{Assets} + R_{Data}}{2} * (0.5 + 0.5 * R_{Media});$$

i. calculating a vulnerability score V using the risk scores for the "Staff", "$3^{rd}$ Parties", "Facilities", "IT Infrastructure", and "Applications" categories, and the formula $$V = \frac{\left( \begin{array}{c} R_{Staff} + R_{3rd\ Parties} + R_{Facilities} + \\ R_{IT\ Infrastructure} + R_{Applications} \end{array} \right)}{5};$$

j. calculating a consequence score C using the normalized inherent risk scores for the "Assets" and "Data" categories and the formula $C = (R_{Assets} + R_{Data})/2$;
   k. calculating a normalized total inherent risk score $R_{Total}$ using said scores for threat, vulnerability and consequence and the formula $$R_{Total} = \sqrt[3]{(TVC)};$$

wherein the steps above are implemented using a computing device.

3. The method of claim 1, wherein step b) comprises:
a. identifying a universe of security best practices and technologies from government and industry regulations, best practice surveys, security control frameworks, intelligence agency security control rankings, and industry analyst guides;
b. using expert judgement to combine and rearrange said best practices and technologies to derive a universe of security controls based on activities, artefacts or properties whose security effectiveness can be quantified with, at minimum an ordinal scale, but preferably an interval or ratio scale;
c. pre-assigning each of said derived security controls to one of the following functional groups: "Governance", "Endpoints", "Network", "Access", "Data", Dependencies" and "Awareness";
d. pre-assigning each of said derived security controls to one of the following lifecycle groups: "Identify", "Prevent", "Limit", Detect", "Respond", "Recover";
e. pre-assigning each of said derived security controls to one of the following security control groups: "Plan", "Policy", "Procedure", "Resource", or "Technical";
f. ensuring that every combination of said functional group and said lifecycle group has at least one security control;
g. pre-assigning a specific priority P1, P2, or P3 to each security control based on best practice surveys, customary norms, intelligence agency security control rankings, NIST Baselines, or Center for Internet Security Implementation Classes;
h. pre-assigning a set of declarative statements to each security control which describe basic, intermediate and advanced levels of functionality, wherein each higher level either subsumes or replaces and improves the functionality of the level(s) below it;
i. designating each of said derived security controls as a predominantly likelihood-reducing security control or impact-reducing security control;
j. pre-assigning a weighting factor $w_i$ for each likelihood-reducing security control i, which is an estimate of the fraction of all security incidents that the security control will block or contain, based on open source data breach statistics;
k. pre-assigning a weighting factor $w_i$ for each impact-reducing security control i, which is an estimate of the fraction by which the security control will reduce the impact of a security incident, based on open source cost of data breach statistics;
l. pre-calculating a maturity score for each possible level of each security control, selecting from said universe of security controls a set of security controls that the organization is expected to implement, prescribing the level of implementation required of said selected security controls to achieve reasonable and effective security based on its normalized total inherent risk, and calculating an expected maturity score for said selected security controls;
m. determining an actual maturity score for said selected security controls based on said pre-calculated maturity scores and a series of multiple choice questionnaires;

wherein the steps above are implemented using a computing device.

4. The method of claim 3, wherein step l) comprises:
a. pre-assigning a numerical value between 0 and 1 for each declarative statement for each security control i, representing an estimate of the degree of functionality $(Degree_i)_L$ of the security control implemented at level L relative to its maximum functionality (implemented at the advanced level);
b. multiplying the weighting factor pre-assigned to each security control by said numerical value for each declarative statement to determine a precalculated maturity score for the security control for basic, intermediate, and advanced levels of functionality, as in the formula $(CS_i)_L = w_i*(Degree_i)_L$, where L is the level of functionality (basic, intermediate, or advanced);
c. pre-calculating cumulative aggregated maturity scores $AM_{\rho\lambda}$ by adding together said precalculated maturity scores for each combination of priority ρ (P1, P2, and P3) and level λ (basic, intermediate, advanced), as in the formula $AM_{\rho\lambda} = AM_{(\rho-1)Advanced} + \Sigma_{i=1}^{N_\rho(CS)}{}_i)_\lambda$, where $N_\rho$ is the number of security controls with priority ρ;
d. dividing said cumulative aggregated maturity scores by the maximum possible cumulative aggregated maturity score, obtained by implementing all security controls (P1, P2, and P3) at the advanced level, to yield a matrix of nine normalized total maturity scores, as in $(M_{Total})_{\rho\lambda} = AM_{\rho\lambda}/\Sigma_{i=1}^{N}w_i$, where N is the total number of security controls;
e. selecting only P1 security controls if the normalized total inherent risk score $R_{Total}$ is equal or less than said normalized total maturity score for P1 at the advanced level, $(M_{Total})_{P1Advanced}$;
f. selecting P1 and P2 security controls if the normalized total inherent risk score $R_{Total}$ is greater than said normalized total maturity score for P1 at the advanced level, $(M_{Total})_{P1Advanced}$, but equal or less than said normalized total maturity score for P2 at the advanced level, $(M_{Total})_{P2Advanced}$;
g. selecting P1, P2 and P3 security controls if the normalized total inherent risk score $R_{Total}$ is greater than said normalized total maturity score for P2 at the advanced level, $(M_{Total})_{P2Advanced}$, but equal or less than said normalized total maturity score for P3 at the advanced level, $(M_{Total})_{P3Advanced}$;
h. for each of said selected security controls, calculating the degree of functionality that the organization is expected to implement to achieve reasonable and effective security based on its normalized total inherent risk;
i. for each selected security control, calculating an expected maturity score by multiplying the expected degree of functionality for this security control by the weighting factor pre-assigned to this security control, as in the formula $ES_i = w_i*ED_{P_i}$;

wherein the steps above are implemented using a computing device.

5. The method of claim 4, wherein step h) comprises:
a. if only P1 security controls are selected, then calculating the expected degree of functionality for all P1 security controls $ED_{P1}$ by dividing the normalized total inherent risk score by the sum of the weighting factors for all P1 security controls, as in the formula $$ED_{P1} = \frac{R_{Total}}{\sum_{i=1}^{I} w_i},$$

where I is the number of security controls with priority P1;
   b. If P1 and P2 security controls are selected, then setting the expected degree of functionality for all P1 security controls to 1 and calculating the expected degree of functionality for all P2 security controls $ED_{P2}$ by subtracting the sum of the weighting factors for all P1 security controls from the normalized total inherent risk sore and dividing the remainder by the sum of the weighting factors for all P2 security controls, as in the formula $ED_{P2}=(R_{Total}-\Sigma_{i=1}^{I}w_i\Sigma_{j=1}^{J}w_j$, where I is the number of security controls with priority P1, and J is the number of security controls with priority P2;
   c. if P1, P2 and P3 security controls are selected, then setting the expected degree of functionality for all P1 and P2 security controls to 1 and calculating the expected degree of functionality for all P3 security controls $ED_{P2}$ by subtracting the sum of the weighting factors for all P1 and P2 security controls from the normalized total inherent risk score and dividing the remainder by the sum of the weighting factors for all P3 security controls, as in the formula $ED_{P3}=(R_{Total}-\Sigma_{i=1}^{I}-\Sigma_{j=1}^{J}w_j)/\Sigma_{k=1}^{K}w_k$, where I is the number of security controls with priority P1, J is the number of security controls with priority P2, and K is the number of security controls with priority P3;
wherein the steps above are implemented using a computing device.

6. The method of claim 3, wherein step m) comprises:
   a. for each of said selected security controls, prompting the user with a choice of declarative statements pre-assigned to the security control and corresponding to each level;
   b. determining based on the response to said choice the actual maturity score for the security control based on said pre-calculated maturity score for the level chosen;
wherein the steps above are implemented using a computing device.

7. The method of claim 1, wherein step c) comprises:
   a. for each of said functional, lifecycle, and control groups, calculating the actual aggregated maturity score by adding up the actual maturity scores for all selected security controls pre-assigned to said functional, lifecycle, or control group, as in the formula $AM_G=\Sigma_{i=1}^{n}CS_i$, where there are n security controls in group G;
   b. for each of said functional, lifecycle, and control groups, calculating the expected aggregated maturity score by adding up the expected maturity scores for all selected security controls pre-assigned to said functional, lifecycle, or control group, as in the formula $EM_G=\Sigma_{i=1}^{n}ES_i$, where there are n security controls in group G;
   c. for each of said functional, lifecycle, and control groups, comparing the actual aggregated maturity score to the expected aggregated maturity score, as in the formula $AM_G<EM_G$?;
   d. if the actual group aggregated maturity score is less than the expected group aggregated maturity score, then identifying the difference as a gap in said functional, lifecycle, or control group and calculating the size of the gap by subtracting the actual group aggregated maturity score from the expected group aggregated maturity score, as in the formula $GS_G=EM_G-AM_G$;
wherein the steps above are implemented using a computing device.

8. The method of claim 1, wherein step d) comprises:
   a. for each group G of said groups with said identified gaps;
   b. for each security control i pre-assigned to said group, calculating the size of the shortfall for the security control by subtracting the actual maturity score from the expected maturity score for this security control, as in the formula $SF_i=ES_i-CS_i$;
   c. sorting all security controls pre-assigned to said group whose actual maturity scores fall short of their expected maturity scores, in ascending order of priority (P1 then P2 then P3) followed by descending order of the size of the shortfall $SF_i$;
   d. working through the sorted list, choosing security controls for improvement, each time subtracting the size of the shortfall $SF_i$ from the size of the gap for said group $GS_G$, until there are no more security controls or the sum of shortfall for the chosen security controls equals or exceeds the size of the gap, as in the formula $GS_G \leq \Sigma_{\rho=P1}^{P3}\Sigma_{i=1}^{g} Max(SF_i)_\rho$, where $Max(SF_i)_\rho$ is the largest remaining shortfall in the sorted list of security controls with priority ρ in group G and g is the number of security controls in group g with a nonzero shortfall;
   e. recommending improvements in functionality for said chosen security controls, according to the declarative statements representing the missing levels of functionality;
wherein the steps above are implemented using a computing device.

* * * * *